(12) United States Patent
Beach et al.

US008189542B2

(10) Patent No.: US 8,189,542 B2
(45) Date of Patent: May 29, 2012

(54) VOICE AND DATA WIRELESS COMMUNICATIONS NETWORK AND METHOD

(75) Inventors: Robert E. Beach, Los Altos, CA (US);
Jason T. Harris, Santa Clara, CA (US);
Richard C. Montgomery, Saratoga, CA (US); Wanda Sealander, Bedford, NH (US)

(73) Assignee: Symbol Technologies, Inc., Holtsville, NY (US)

( * ) Notice: Subject to any disclaimer, the term of this patent is extended or adjusted under 35 U.S.C. 154(b) by 983 days.

(21) Appl. No.: 11/192,574

(22) Filed: Jul. 29, 2005

(65) Prior Publication Data

US 2005/0281252 A1 Dec. 22, 2005

Related U.S. Application Data

(63) Continuation of application No. 10/033,861, filed on Dec. 27, 2001, which is a continuation of application No. 09/627,092, filed on Jul. 27, 2000, now Pat. No. 6,404,772.

(51) Int. Cl.
*H04W 4/00* (2009.01)
(52) U.S. Cl. ........................................ 370/338
(58) Field of Classification Search .................. 370/229, 370/235, 236, 328, 338
See application file for complete search history.

(56) References Cited

U.S. PATENT DOCUMENTS

| 4,168,400 | A | 9/1979 | de Couasnon et al. |
|---|---|---|---|
| 4,500,987 | A | 2/1985 | Hasegawa |
| 4,503,533 | A | 3/1985 | Tobagi et al. |
| 4,516,239 | A | 5/1985 | Maxemchuk |
| 4,630,264 | A | 12/1986 | Wah |
| 5,029,183 | A | 7/1991 | Tymes |
| 5,103,461 | A | 4/1992 | Tymes |
| 5,115,432 | A * | 5/1992 | Haas .............................. 370/469 |
| 5,142,550 | A | 8/1992 | Tymes |
| 5,157,687 | A | 10/1992 | Tymes |
| 5,231,633 | A | 7/1993 | Hluchyj et al. |
| 5,280,498 | A | 1/1994 | Tymes et al. |
| 5,329,531 | A | 7/1994 | Diepstraten et al. |

(Continued)

FOREIGN PATENT DOCUMENTS

WO 99/11003 A1 3/1999

(Continued)

OTHER PUBLICATIONS

Deng D-J et al., "A priority scheme for IEEE 802.11 DCF Access Method", IEICE Transactions on Communication, Communications Society, vol. E82-B, No. 1, Jan. 1999, pp. 96-102.

(Continued)

*Primary Examiner* — Dang Ton
*Assistant Examiner* — Nourali Mansoury

(57) ABSTRACT

A wireless local area network that carries mixed traffic of voice and data communications may be provided. The wireless local area network may include an access point and a plurality of remote terminals that are associated with the access point. The access point may be operably coupled to a wireline network. The access point may receive voice and other communications packets from the remote terminals and the wireline network. Some of the packets may be for transmission to the remote terminals. The access point manages which packets to transmit and when to transmit packets. The access point may manage traffic to maintain a fair distribution of packets and to give priority to voice communications over other communications.

10 Claims, 16 Drawing Sheets

U.S. PATENT DOCUMENTS

| | | | |
|---|---|---|---|
| 5,343,473 A | 8/1994 | Cidon et al. | |
| 5,418,812 A | 5/1995 | Reyes et al. | |
| 5,479,441 A | 12/1995 | Tymes et al. | |
| 5,517,495 A | 5/1996 | Lund et al. | |
| 5,528,621 A | 6/1996 | Heiman et al. | |
| 5,594,738 A | 1/1997 | Crsiler et al. | |
| 5,668,803 A | 9/1997 | Tymes et al. | |
| 5,734,867 A | 3/1998 | Clanton et al. | |
| 5,812,589 A | 9/1998 | Sealander et al. | |
| 5,815,811 A | 9/1998 | Pinard et al. | |
| 5,841,778 A | 11/1998 | Shaffer et al. | |
| 5,844,900 A | 12/1998 | Hong et al. | |
| 5,870,388 A | 2/1999 | Yung et al. | |
| 5,872,777 A | 2/1999 | Brailean et al. | |
| 5,875,179 A | 2/1999 | Tikalsky | |
| 5,933,607 A | 8/1999 | Tate et al. | |
| 5,982,779 A | 11/1999 | Krishnakumar et al. | |
| 6,011,784 A | 1/2000 | Brown et al. | |
| 6,061,559 A | 5/2000 | Eriksson et al. | |
| 6,078,568 A | 6/2000 | Wright et al. | |
| 6,088,591 A | 7/2000 | Trompower et al. | |
| 6,188,698 B1 | 2/2001 | Galand et al. | |
| 6,240,083 B1 | 5/2001 | Wright et al. | |
| 6,256,334 B1 | 7/2001 | Adachi | |
| 6,285,662 B1 | 9/2001 | Watanabe et al. | |
| 6,330,231 B1 * | 12/2001 | Bi | 370/328 |
| 6,404,772 B1 | 6/2002 | Beach et al. | |
| 6,438,135 B1 | 8/2002 | Tzeng | |
| 6,594,240 B1 | 7/2003 | Chuah et al. | |
| 6,678,280 B1 * | 1/2004 | Kim et al. | 370/429 |
| 6,680,922 B1 * | 1/2004 | Jorgensen | 370/328 |
| 6,721,331 B1 | 4/2004 | Agrawal et al. | |
| 6,751,459 B1 | 6/2004 | Lee et al. | |
| 6,862,622 B2 * | 3/2005 | Jorgensen | 709/226 |
| 7,359,971 B2 * | 4/2008 | Jorgensen | 709/226 |
| 2002/0054574 A1 | 5/2002 | Beach et al. | |
| 2002/0089989 A1 | 7/2002 | Christensen et al. | |
| 2002/0101826 A1 * | 8/2002 | Giacopelli et al. | 370/252 |
| 2005/0058147 A1 | 3/2005 | Regnier et al. | |
| 2005/0281235 A1 | 12/2005 | Beach et al. | |
| 2006/0002378 A1 | 1/2006 | Beach et al. | |
| 2007/0008916 A1 | 1/2007 | Haugli et al. | |
| 2007/0038751 A1 * | 2/2007 | Jorgensen | 709/226 |
| 2009/0046735 A1 | 2/2009 | Regnier et al. | |

FOREIGN PATENT DOCUMENTS

| | | |
|---|---|---|
| WO | 99/25147 A2 | 5/1999 |
| WO | 99/63712 | 12/1999 |
| WO | 00/30307 | 5/2000 |
| WO | 00/41542 | 7/2000 |
| WO | 01/05098 | 1/2001 |

OTHER PUBLICATIONS

Chhaya H.S. et al., "Throughput and Fairness Properties of Asynchronous Data Transfer Methods in the IEEE 802.11 MAC Protocol", Personal , Indoor and Mobile Radio Communications, vol. 2, Sep. 1995, pp. 613-617.

Wong W K et al.., Scheduling for Integrated Services in Next Generation Packet Broadcast Networks, Wireless Communications and Networking Conference, Sep. 21, 1999 pp. 1278-1282.

Final Office Action for U.S. Appl. No. 11/193,521 mailed Jun. 29, 2009, a related application.

Godfrey, T., "Meetings at the 802.11 Nov. 1999 Plenary," IEEE 802.11 (Submission), Nov. 1999, pp, 2-13.

Geier, Jim, "Wireless Lans: Implementing Interoperable Networks," Chapter 3 (pp. 89-125), Chapter 4 (pp. 129-157), Chapter 5 (pp. 159-189), Chapter 6 (pp. 193-234), 1999, United States, 76 pages.

USPTO, U.S. Appl. No. 10/033,861, Office Action, Non-Final Rejection, Nov. 2, 2004, 13 pages.

Australian Patent Office, Australian Application No. 2008203424 (corresponding to U.S. Appl. No. 10/033,861), Office Action, Sep. 15, 2008, 3 pages.

USPTO, U.S. Appl. No. 10/033,861, Office Action, Non-Final Rejection, Nov. 28, 2008, 10 pages.

USPTO, U.S. Appl. No. 10/033,861, Office Action, Final Rejection, Apr. 30, 2009, 9 pages.

USPTO, U.S. Appl. No. 10/033,861, Office Action, Non-Final Rejection, Dec. 24, 2009, 19 pages.

European Patent Office, EP Application No. 05018176, European Search Report, Nov. 14. 2005, 2 pages.

USPTO, U.S. Appl. No. 11/193,521, Office Action, Non-Final Rejection, Aug. 20, 2008, 34 pages.

USPTO, U.S. Appl. No. 11/193,527, Office Action, Final Rejection, Mar. 2, 2009, 24 pages.

USPTO, U.S. Appl. No. 11/193,521, Office Action, Final Rejection, Jan. 21, 2010, 22 pages.

USPTO, U.S. Appl. No. 11/193,772, Office Action, Non-Final Rejection, Aug. 26, 2008, 21 pages.

USPTO, U.S. Appl. No. 11/193,772, Office Action, Non-Final Rejection Jan. 25, 2010, 14 pages.

Canadian Intellectual Property Office, Canadian Application 2,389,109 (corresponding to U.S. Appl. No. 10/033,861), Office Action, Nov. 13, 2009, 2 pages.

Canadian Intellectual Property Office, Canadian Application 2,517,821 (corresponding to U.S. Appl. No. 11/193,521), Office Action, Jul. 22, 2009, 3 pages.

Canadian Intellectual Property Office, Canadian Application 2,517,832 (corresponding to U.S. Appl. No. 11/192,574), Office Action, Jan. 5, 2010, 3 pages.

Canadian Intellectual Property Office, Canadian Application 2,517,825 (corresponding to U.S. Appl. No. 11/193,521), Office Action, Jul. 23, 2007, 3 pages.

Canadian Intellectual Property Office, Canadian Application 2,517,821 (corresponding to U.S. Appl. No. 11/193,521), Office Action, Mar. 14, 2008, 4 pages.

Canadian Intellectual Property Office, Canadian Application 2,517,832 (corresponding to U.S. Appl. No. 11/192,574), Office Action, Mar. 6, 2009, 3 pages.

Canadian Intellectual Property Office, Canadian Application 2,517,832 (corresponding to U.S. Appl. No. 11/192,574); Office Action, May 26, 2008, 3 pages.

Non Final Office action mailed on Nov. 2, 2004 in U.S. Appl. No. 10/033,861, filed Dec. 27, 2001.

Non Final Office Action for U.S. Appl. No. 11/193,772 mailed Jul. 9, 2009, a related application.

Final Office Action for U.S. Appl. No. 10/033,861 mailed Oct. 5, 2011.

Non Final Office Action for U.S. Appl. No. 10/033,861 mailed Apr. 12, 2011.

Final Office Action for U.S. Appl. No. 10/033,861 mailed Jul. 26, 2010.

Non Final Office Action for U.S. Appl. No. 11/193,521 mailed Sep. 6, 2011.

Non Final Office Action for U.S. Appl. No. 11/193,521 mailed Feb. 3, 2011.

Final Office Action for U.S. Appl. No. 11/193,521 mailed Sep. 16, 2010.

Non Final Office Action for U.S. Appl. No. 11/193,521 mailed May 26, 2010.

Non Final Office Action for U.S. Appl. No. 11/193,772 mailed Jul. 6, 2011.

Non Final Office Action for U.S. Appl. No. 11/193,772 mailed Jan. 5, 2011.

Final Office Action for U.S. Appl. No. 11/193,772 mailed Aug. 4, 2010.

Canadian Intellectual Property Office, Canadian Application 2,517,832 (corresponding to U.S. Appl. No. 11/192,574), Office Action, Sep. 7, 2010, 3 pages.

Canadian Intellectual Property Office, Canadian Application 2,517,825 (corresponding to U.S. Appl. No. 11/193,521), Notice of Allowance, Mar. 10, 2009, 1 page.

European Patent Office, EP Application No. 05018176, European Office Action, Jun. 15, 2010, 6 pages.

European Patent Office, EP Application No. 05018175, European Search Report, Nov. 17, 2005, 14 pages.

European Patent Office, EP Application No. 05018175, European Office Action, Jun. 15, 2010, 05 pages.

European Patent Office, EP Application No. 05018174, European Search Report, Dec. 30, 2005, 14 pages.

European Patent Office, EP Application No. 05018174, European Office Action, Jun. 15, 2010, 06 pages.

* cited by examiner

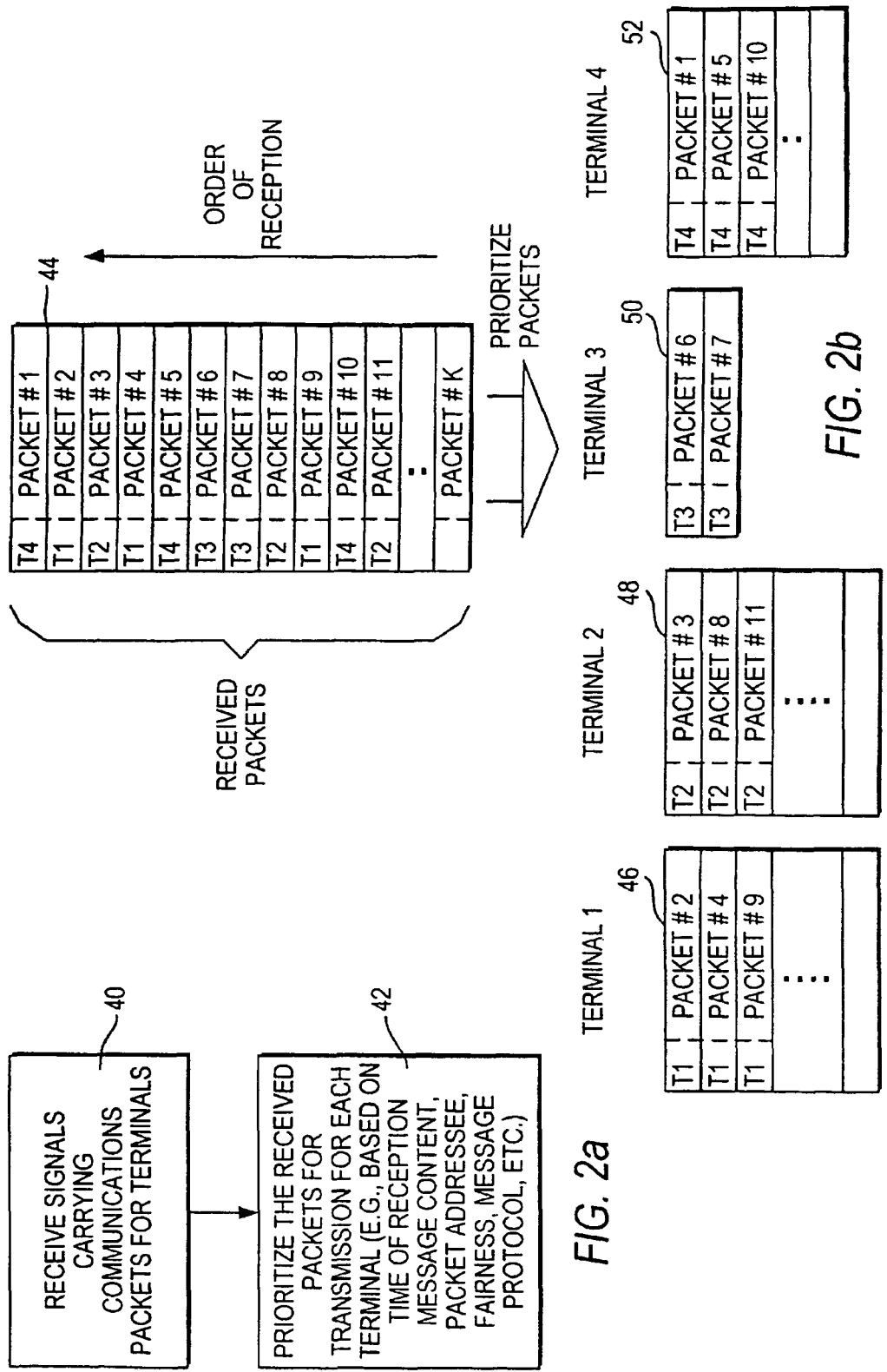

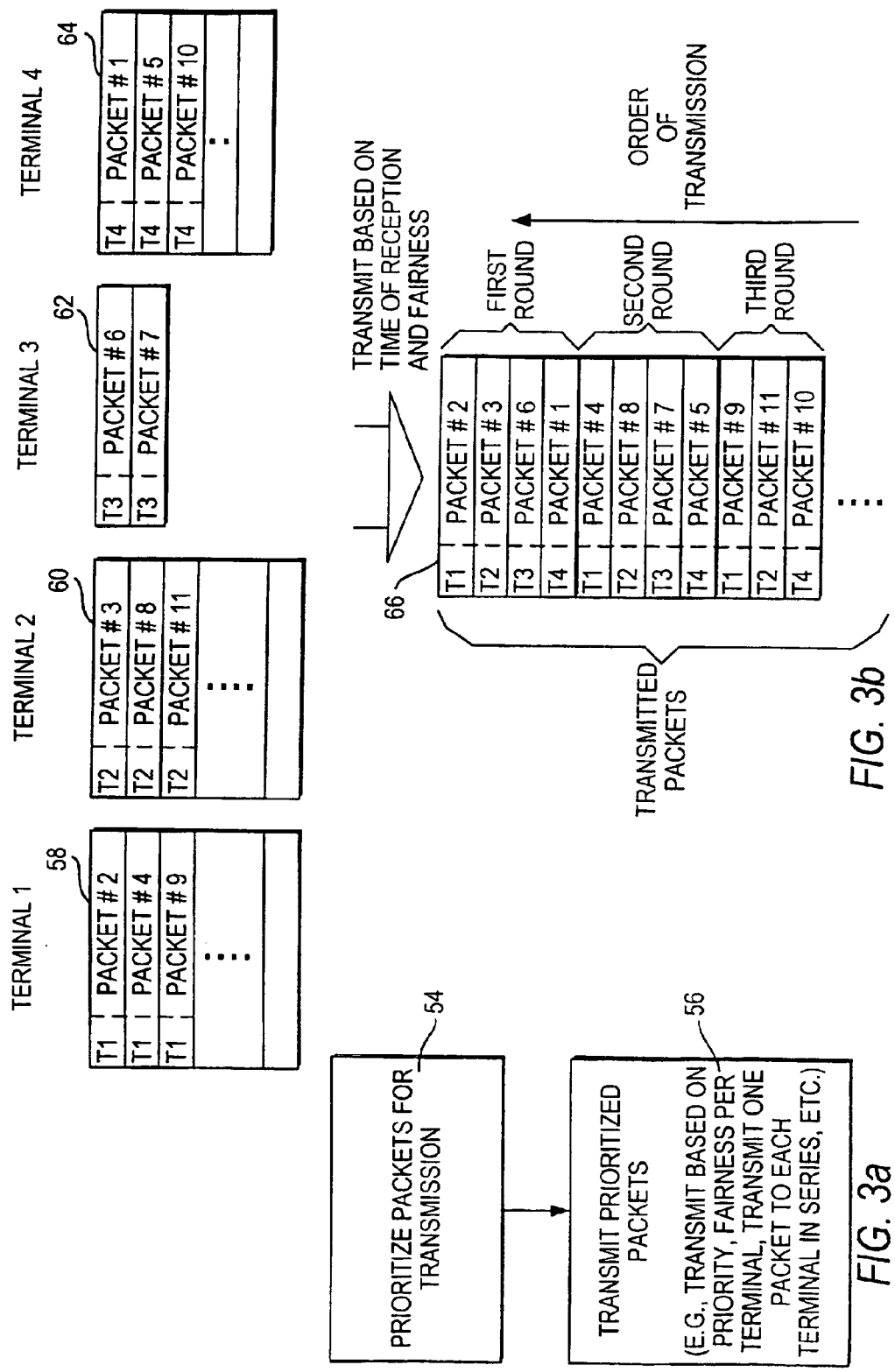

VOICE AND DATA WIRELESS COMMUNICATIONS NETWORK AND METHOD

PRIORITY CLAIM

This application is a Continuation of U.S. patent application Ser. No. 10/033,861 filed on Dec. 27, 2001 "Voice and Data Wireless Communications Network and Method" which is a Continuation of U.S. patent application Ser. No. 09/627,092 filed Jul. 27, 2000 now U.S. Pat. No. 6,404,772 issued Jun. 11, 2002 "Voice and Data Wireless Communications Network and Method". The entire disclosures of this prior applications, are considered as being part of the disclosure of the accompanying application and are hereby expressly incorporated by reference herein.

FIELD OF INVENTION

This invention relates to wireless local area networks ("LANs"), and more particularly, to wireless local area networks that carry a mixed traffic of voice and data.

BACKGROUND INVENTION

Background

This invention relates to wireless local area networks ("LANs"), and more particularly, to wireless local area networks that carry a mixed traffic of voice and data.

Wireless LANs are typically used in applications that involve mobile computers, in applications where wireline installation is not feasible, etc. Such applications include warehouse inventory tracking, portable point of sale, shipping and receiving, package tracking, etc.

The IEEE 802.11 communications standard has been used by some vendors to provide interoperability between wireless LAN equipment. The 802.11 standard specifies a protocol in which information is transmitted in packets. The standard specifies features such as packet size, packet content information, data rates, roaming, etc. The primary type of information that was initially transmitted in systems that were designed to the 802.11 standard as published was information such as barcode information, point of sale information, package tracking information, etc. In such known systems, several remote terminals may be in communications with a single access point to receive and transmit information such as bar code information, point of sale information, package tracking information, etc. The standard as published specifies a communications medium that is shared by transmitters (e.g., an access point and one or more remote terminals).

The standard further specifies that packet size may vary. A remote terminal that has a relatively large packet to transmit may need to occupy the shared communications medium for a longer period than a remote terminal that has a relatively short packet to transmit. Until recently, delays in communicating packets have typically been non-critical to providing communications at least partly because of the type of information that has been transmitted in such systems. Information such as bar code information, package tracking information, etc, typically remains valid until a next incremental event occurs (e.g., until bar code information has changed, until a package is tracked to a next point in route, etc.). In addition, such information does not generally affect system communications if delivered with some delay.

SUMMARY OF INVENTION

In some known systems, packets are simply transmitted in the order in which they have been received for transmission. In these known systems, a packet that is transmitted without being properly acknowledged by its intended recipient is repeated for a predetermined number of times while transmission of other remaining packets is delayed. After retransmitting a packet for a predetermined number of times without receiving a proper acknowledgment, the transmitter may proceed to transmit the remaining packets.

The demand for providing mixed voice and data traffic in wireless LAN systems has been increasing over recent years. Currently, the 802.11 standard does not provide specifications for providing voice communications. Information for providing voice communications is generally much more time critical than other information such as bar code information, package tracking information, etc. Communications for providing voice communications may require a greater volume of information to be carried by the system than when the system is providing communications for information that has typically been carried by wireless LANs. Moreover, the quality of voice communications is dependent on the rate in which information is exchanged. In data communications such as in communications for package tracking, the rate in which information is exchanged is non-critical because the quality of such communications is typically not a factor in evaluating the effectiveness of such communications.

Some known wireless LANs carry voice signals as part of the communications traffic but these systems are deficient in effectively meeting such complex communications demands as discussed above. Moreover, there may be a need to meet such demands with existing systems without substantially increasing system complexity, structure, design, cost, etc.

In accordance with the principles of the present invention, a mixed traffic voice and data communications transmitter and network may be provided. The communications network may be a wireless local area network that uses packet based communications. The communications network may include at least one access point that receives voice and other communications for transmission to terminals that are associated with the access point.

To manage the transmission of packets, a transmitter may prioritize packets. Prioritization may be based on when each packet has been received, whether the packets contain voice communications, whether the packets contain network-management communications, whether the packets contain data communications (e.g., communications other than for voice or network management), whether the packet is directed to a voice-capable unit, whether a packet was transmitted using a particular communications protocol, etc.

A transmitter, such as an access point, may prioritize packets for transmission based on to which receiver terminal the packets have been addressed. Packets may be separated into queues with each queue storing the packets that have been received for transmission to a particular terminal. Packets may be further prioritized within each queue.

Prioritized packets may be transmitted in a sequence that allows a fair opportunity to each terminal to receive the same number of packets. For example, packets may be transmitted in rounds. In each round, the highest priority packet for each terminal may be transmitted (e.g., in a one packet per round per terminal fashion). In each round, an equal number of packets may be transmitted to each terminal (e.g., one per packet).

For each transmitted packet, an acknowledgment (e.g., an acknowledge packet) from a receiving terminal may be required before the transmitter discards the transmitted packet or moves onto transmitting the next packet for that terminal. A transmitter may repeatedly transmit a packet until it is acknowledged or until a retry threshold (e.g., a total number of times that a packet is to be transmitted) has been reached. The retry threshold may be determined based on whether the packet that is being retransmitted is for voice communications. The retry threshold for voice communications may be lower than for other communications. In communications networks that use frequency hopping spread spectrum communications, a packet may be retransmitted when the number of times the packet has been transmitted reaches an initial retry threshold. When the initial retry threshold is reached without an acknowledgment being received, retransmission may be discontinued until after a frequency hop in modulation. Thereafter, retransmissions may resume until an acknowledgment is received or until a total retry threshold has been reached. The initial and total retry thresholds may vary based on whether the packet that is being retransmitted is for voice communications.

New packets that are received and prioritized may have a higher priority than unacknowledged packets. Retransmission of an unacknowledged packet may be preempted when a packet with a priority that is higher than the packet being retransmitted is received. A transmitter may transmit a newly received packet for a particular terminal over other earlier received packets for that same terminal when the newly received packet is determined to have a higher priority than the other packets. An unacknowledged packet may then be retransmitted in a later round.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which:

FIG. 2a is a flow chart of illustrative steps involved in managing packet traffic for use in a transmitter in accordance with the present invention;

FIG. 2b is a diagram of illustrative queues that may be implemented based on the illustrative steps of FIG. 2a in accordance with the present invention;

FIG. 3a is a flow chart of illustrative steps involved in transmitting packets in accordance with the present invention;

FIG. 3b is a diagram of illustrative queues that may be implemented based on the illustrative steps of FIG. 3a in accordance with the present invention;

DETAILED DESCRIPTION OF THE INVENTION

The present invention improves mixed traffic voice communications for wireless local area networks ("LANs") by substantially meeting the communications demands that have been mentioned above. Packets that are to be transmitted in a wireless LAN over a half-duplex communication medium are transmitted in order of priority. Priority may be determined based on at least whether a particular packet is for providing voice communications. One technique for determining whether a packet is for voice communications is to determine whether the intended recipient of the packet has been identified to be voice-capable and further determining whether the packet was received for transmission using a particular communications protocol (e.g., a protocol typically used to send voice communications). Other techniques for prioritizing packets for transmission and for determining which packets are for voice communications are discussed below.

Giving high priority to voice communications may block other non-voice communications packets from being transmitted. Blocking may be substantially prevented by providing for fair distribution of packets. Packets may be distributed fairly by transmitting packets in rounds where in each round one packet (e.g., the highest priority packet) is transmitted for every receiver (e.g., a remote terminal). In the case of a packet that is transmitted without being acknowledged by its intended recipient, the packet may be retransmitted in the next round of transmissions except for when another packet with a higher priority than the unacknowledged packet has been recently received for transmission to the same terminal. The recently received packet with a higher priority will be transmitted before the unacknowledged packet is transmitted again. The number of times a packet is retransmitted may be determined based on whether the packet is for providing voice communications. Priority may also be given to voice communications by using techniques that are discussed below that give greater access to the communications medium to transmitters that are about to transmit packets that are for voice communications.

Figure 1:
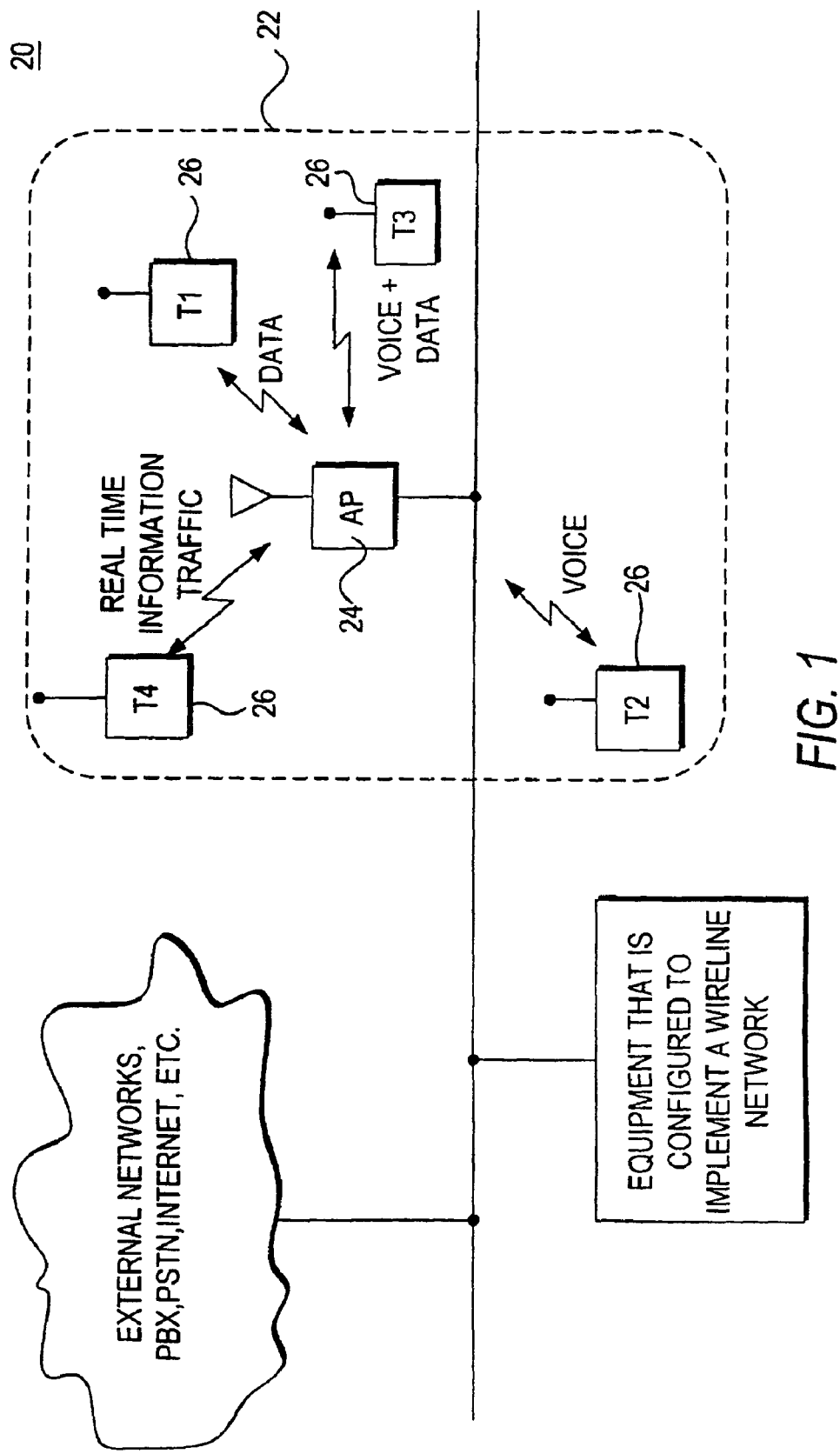
FIG. 1 is a diagram of an illustrative communications network that includes an illustrative wireless local area network in accordance with the present invention.

With reference to FIG. 1, wireless local area network ("LAN") 20 may include a plurality of cells 22. For brevity and clarity, wireless LAN 20 is illustrated and discussed primarily in the context of a LAN having one cell 22. Cell 22 may include an access point 24 (which is sometimes referred to as a wireless local bridge). Cell 22 may include remote terminals 26. Each terminal 26 may be a mobile, portable, or stationary terminal. Each terminal 26 may be a desktop workstation, laptop computer, palm top computer, handheld personal computer, pen-based computer, personal digital assistant, handheld scanner, data collector, handheld printer, etc. Each terminal 26 may include wireless-network-interface resources that are configured to provide two-way radio or infrared signal communications. Such resources may include an interface card (or an external modem), a software driver, and an antenna. Other suitable resources may also be used, but for clarity and brevity, the wireless network interface resources will be discussed primarily in the context of an interface card, a software driver, and an antenna. The interface card may have been configured to use a standard computer-bus interface (e.g., ISA, PCMCIA, etc.) or standard computer port (e.g., Rs232, RS422, etc.) to provide convenient access to terminal equipment.

A network-operating-system may be implemented on each terminal 26. In each terminal 26, the interface card may be coupled to the network-operating-system application using the software driver. The interface card for each remote terminal 26 may be a network-communications interface. The network interface card for each terminal 26 is typically implemented to use a carrier sense access protocol and to modulate communications signals with a spreading sequence.

Access point 24 may be an interface for communicating between wireless network 20 and a wireline network. Access point 24 may be configured to provide a communications gateway between terminals 26 that are in cell 22 and between a wireline network and the terminals 26. Access point 24 may include a resource(s) (e.g., software, hardware, or a combination thereof) that is configured to connect the access point to a wireline network (e.g., on ethernet network, a token ring network, etc.). Access point 24 is typically configured to convert signals between wireline and wireless communications mediums. The conversion may allow the access point to pass communication information between the wireline network and wireless remote terminals 26.

Access points are typically provided with sufficient processing, hardware, software, etc. to operate in compliance with the IEEE 802.11 (e.g., to provide 802.11 roaming, standard 802.11 data rates, etc.) and to provide additional features that are developed by a vendor. Access point 24 may be implemented using a personal computer (e.g., a Power PC, an IBM compatible computer), server, workstation, etc., having an appropriate operating system, wireless-network-interface resources, wireline-network-interface resources, network-operating-system applications, etc.

Access point 24 and remote terminals 26 may be configured to communicate using spread spectrum modulation techniques (e.g., direct sequence spread spectrum modulation, frequency hopping spread spectrum modulation, etc.).

The IEEE 802.11 standard specifies the format and content of communications packets. Communications packets that may also be referred to as frames may be of variable size with the size of each packet being identified in packet header information. In some embodiments, the body of each packet may vary from 0 to 2312 octets.

In operation, initially when one of the terminals 26 is powered, that terminal 26 may seek to join cell 22 by associating with access point 24. Remote terminal 26 may become associated with access point 24 after a preliminary exchange of communications between access point 24 and terminal 26. A plurality of terminals 26 may be associated with each access point 24. Each terminal 26 may have different communications capabilities and requirements. Access point 24 may manage the communications traffic between terminals 26 and the wireline network. Access point 24 may manage the communications traffic by controlling when packets are transmitted to each remote terminal 26 in cell 22. The communications traffic in cell 22 may include data packets (e.g., signals that carry packets to provide data communications), voice packets (e.g., signals that carry packets to provide voice communications), real-time packets (e.g., signals that carry packets to provide real-time communications such as multimedia or voice communications), management packets (e.g., signals that carry packets to provide network management communications), etc.

The wireline network that is coupled to access point 24 may include equipment 23 that is configured to implement the wireline network. The wireline network may be coupled to an external network (e.g., PBX, PSTN, Internet, etc.)

Access point 24 may manage communications traffic by prioritizing packets that are to be transmitted to the remote terminals 26 that are associated with access point 24. Illustrative steps involved in managing communications traffic for use in an access point such as access point 24 of FIG. 1 are shown in FIG. 2a. At step 40, an access point may receive signals carrying packets that are to be transmitted to remote terminals (e.g., packets that are addressed to individual terminals 26 in cell 22 of FIG. 1). At step 42, the access point may prioritize the received packets for transmission. An access point may prioritize received packets to determine to which remote terminal to transmit a packet next and to determine which one of the packets that are to be transmitted to that remote terminal will be the packet to be transmitted next. Prioritization may be performed in intervals as packets are received by the access point. For example, prioritization may be performed at regular periodic intervals. Each packet may be prioritized based on time of reception, packet content, packet address information, message protocol, fairness to each terminal, etc.

For clarity, the management of packet communications traffic is primarily discussed in the context of queues. Techniques other than the use of queues may also be used for managing packet communications traffic. Illustrative queues 44, 46, 48, 50 and 52 of FIG. 2b may be provided based on the illustrative steps of FIG. 2a. Queue 44 includes illustrative packets in the order in which they were received by an access point. The packets in queue 44 may have been received from remote terminals that are associated with the access point or from a wireline network. The packets in queue 44 are packets that are directed to four terminals T1, T2, T3 and T4. Queues 46, 48, 50 and 52 may include packets from queue 44 when the packets have been prioritized by the access point. Each respective queue 46, 48, 50 and 52 is a queue that is associated with a respective terminal T1, T2, T3, and T4. Within each queue 46, 48, 50 and 52 packets may have been prioritized based on when the packets were received.

Each packet illustrated in queue 44 has a terminal address and a packet number. The packet number is used here for illustrative purposes to show the order in which packets were received by the access point. In queues 46, 48, 50 and 52, packets with lower packet numbers are higher in transmission priority because they were received first.

Packets may be transmitted based on priority. Illustrative steps involved in transmitting packets are shown in FIG. 3a. At step 54, an access point may prioritize packets for transmission. At step 56, the prioritized packets may be distributed by transmitting packets based on priority, based on fairness, based on fairness and priority, based on fairness per terminal, based on a one packet per terminal transmission sequence, etc. If desired, fairness may be determined as part of step 54 when the access point prioritizes packets.

Illustrative queues 58, 60, 62, 64 and 66 of FIG. 3b may be provided based on the illustrative steps of FIG. 3a. Queues 58, 60, 62 and 64 may each be associated with a respective terminal (T1, T2, T3, and T4). The packets may have been received by an access point for transmission to terminals (T1, T2, T3, and T4). In each queue, the packets may have been prioritized based on time of reception. To achieve fairness, the access point may transmit packets in rounds. In each round, the access point may transmit the same number of packets (e.g., one packet) to each terminal.

Queue 66 includes the packets from queues 58, 60, 62 and 64 in the sequence in which the packets are to be transmitted. The sequence may be divided into rounds with each round including one packet per terminal. As shown, the first and second rounds each have four packets, one for each terminal that is associated with the access point. The third round includes three packets because there are no more packets that are pending to be transmitted to T3 in queue 62 after the first two rounds were successfully transmitted.

An access point may select and transmit packets for each terminal in each round in the order in which the packets for that terminal were received by the access point. With continued reference to FIG. 3b, in the first round, the access point transmits packets nos. 2, 3, 6 and 1 that are each the first packet in queues 58, 60, 62, and 64, respectively. In the second round, the access point transmits packets nos. 4, 8, 7 and 5 that are each the next packet that was received for each terminal T1, T2, T3 and T4, respectively. In each round, one packet from each queue is transmitted without having competition between the queues for a position in the round.

The illustrative packets in FIG. 3b (and in the other FIGS.) are variable size packets. The packets are illustrated as fixed length packets to simplify the figures.

Figure 4A:
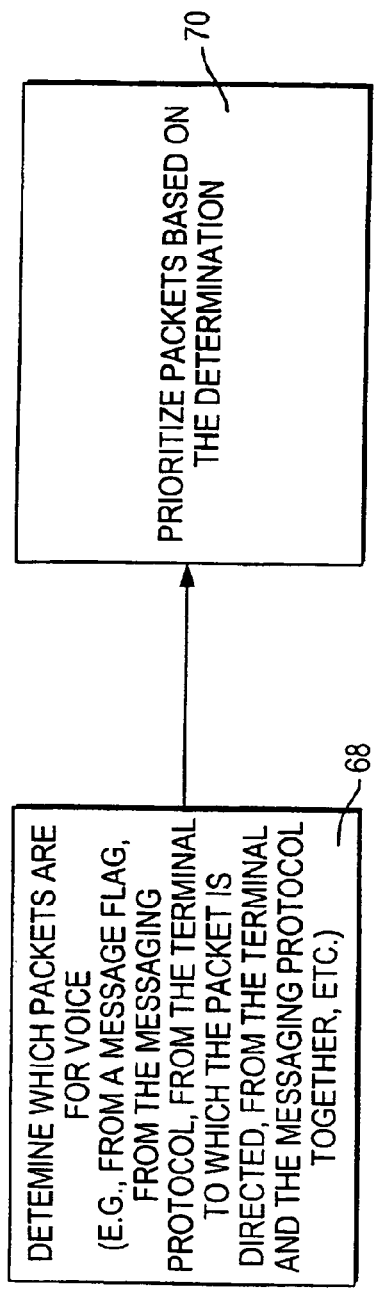
FIG. 4a is a flow chart of illustrative steps involved in managing packet traffic based on which packets are for voice in accordance with the present invention.

The access point may prioritize packets based on which packets are for voice communications. Illustrative steps involved in prioritizing packets based on which packets are for voice communication are shown in FIG. 4a. At step 68, an access point may determine which of the packets that are to be transmitted are for voice communications.

Packets that are for voice communications may be packets that carry digitized voice communications. As discussed above, voice communications typically have stricter transmission requirements than other communications such as inventory data, point of sale information, etc. The access point may determine which packet is for voice based on a message flag in the packet, based on the packet being addressed to a voice-capable terminal, based on the messaging protocol (discussed further below), etc. At step 70, packets may be prioritized based on determining which packets are for voice. Packets for voice communications may be prioritized higher than other packets.

Figure 4B:
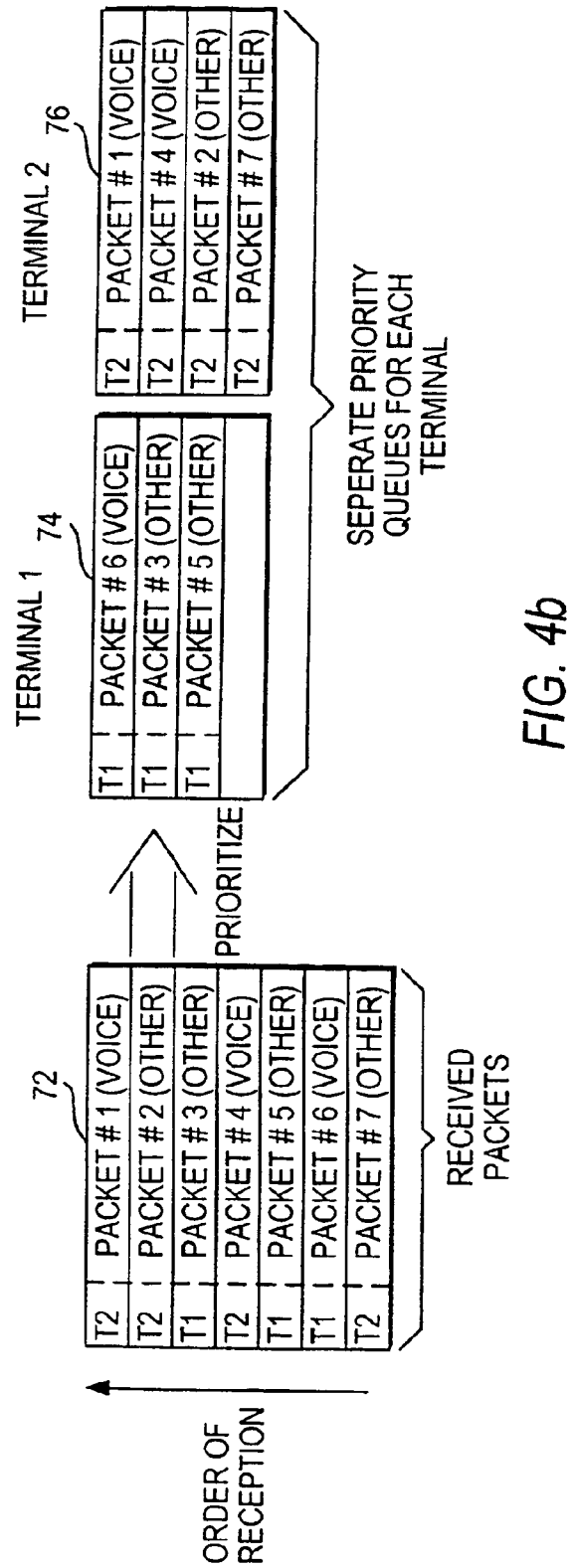
FIG. 4b is a diagram of illustrative queues that may be implemented based on the illustrative steps of FIG. 4a in accordance with the present invention.

Illustrative queues 72, 74 and 76 of FIG. 4b may be provided based on the illustrative steps of FIG. 4a. Queue 72 may include packets that have been received by an access point for transmission to terminals T1 and T2. Queue 72 includes packets that are to be transmitted to provide voice communications (packets nos. 1, 4 and 6). Packets that are for voice communications are prioritized higher than other packets in queues 74 and 76 so that these voice packets are transmitted before other packets. Queue 74 for terminal T1 includes voice packet no. 6 that is prioritized higher than packets nos. 3 and 5 which were received before packet no. 6. Queue 76 for terminal T2 includes voice packets nos. 1 and 4 that are prioritized higher than packets nos. 2 and 7 that are for other communications. Within each queue, voice packets are prioritized to be transmitted before other packets. All packets in a queue are further prioritized for transmission based on when each packet was received by the access point.

Figure 5A:
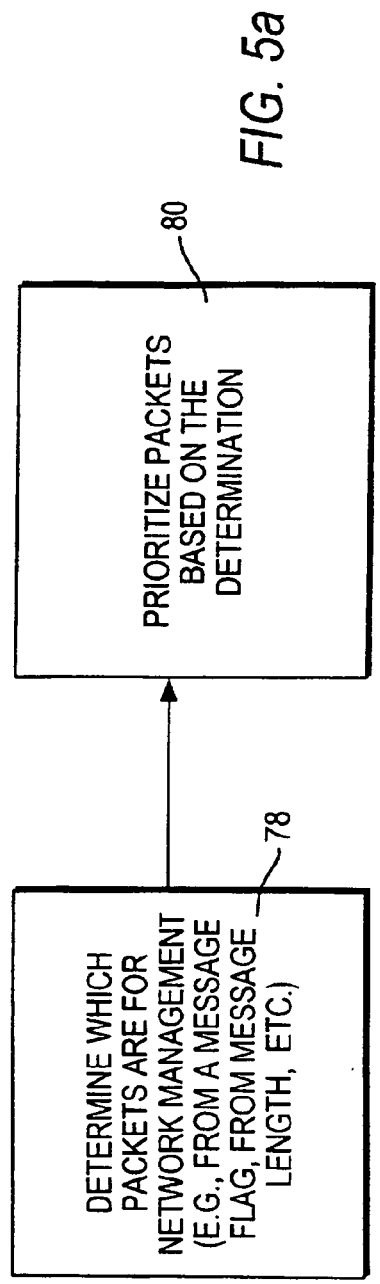
FIG. 5a is a flow chart of illustrative steps involved in managing packet traffic based on which packets are for network management in accordance with the present invention.

An access point may prioritize packets based on network management requirements. Illustrative steps involved in prioritizing packets based on network management requirements are shown in FIG. 5a. At step 78, the access point may determine which ones of the packets are to be transmitted to manage network operations. Packets are determined to be for network management based on a message flag, message length, etc. At step 80, packets may be prioritized based on which packets are for network management.

Figure 5B:
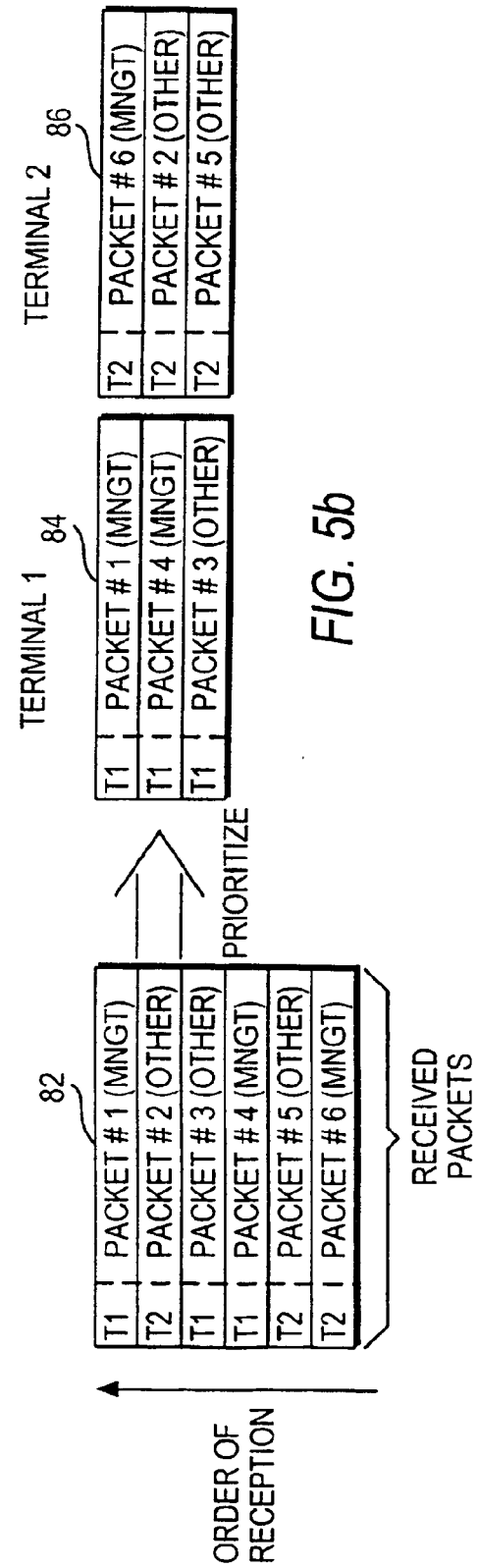
FIG. 5b is a diagram of illustrative queues that may be implemented based on the illustrative steps of FIG. 5a in accordance with the present invention.

Illustrative queues 82, 84 and 86 of FIG. 5b may be provided based on the illustrative steps of FIG. 5a. Queue 82 of received packets may include packets nos. 1, 4 and 6 that are to be transmitted to provide network management. Management packets may be prioritized higher than other packets to protect the integrity of network operations. Queues 84 and 86 may be implemented for terminals T1 and T2, respectively. Management packets nos. 1 and 4 are prioritized higher (i.e., positioned at top of the queue) than the other packet in queue 84 for T1 and management packet no. 6 is prioritized higher than the other packets in queue 86 for T2. The higher priority packets in each queue are to be transmitted before the lower priority packets in the queue.

Figures 6A, 6B:
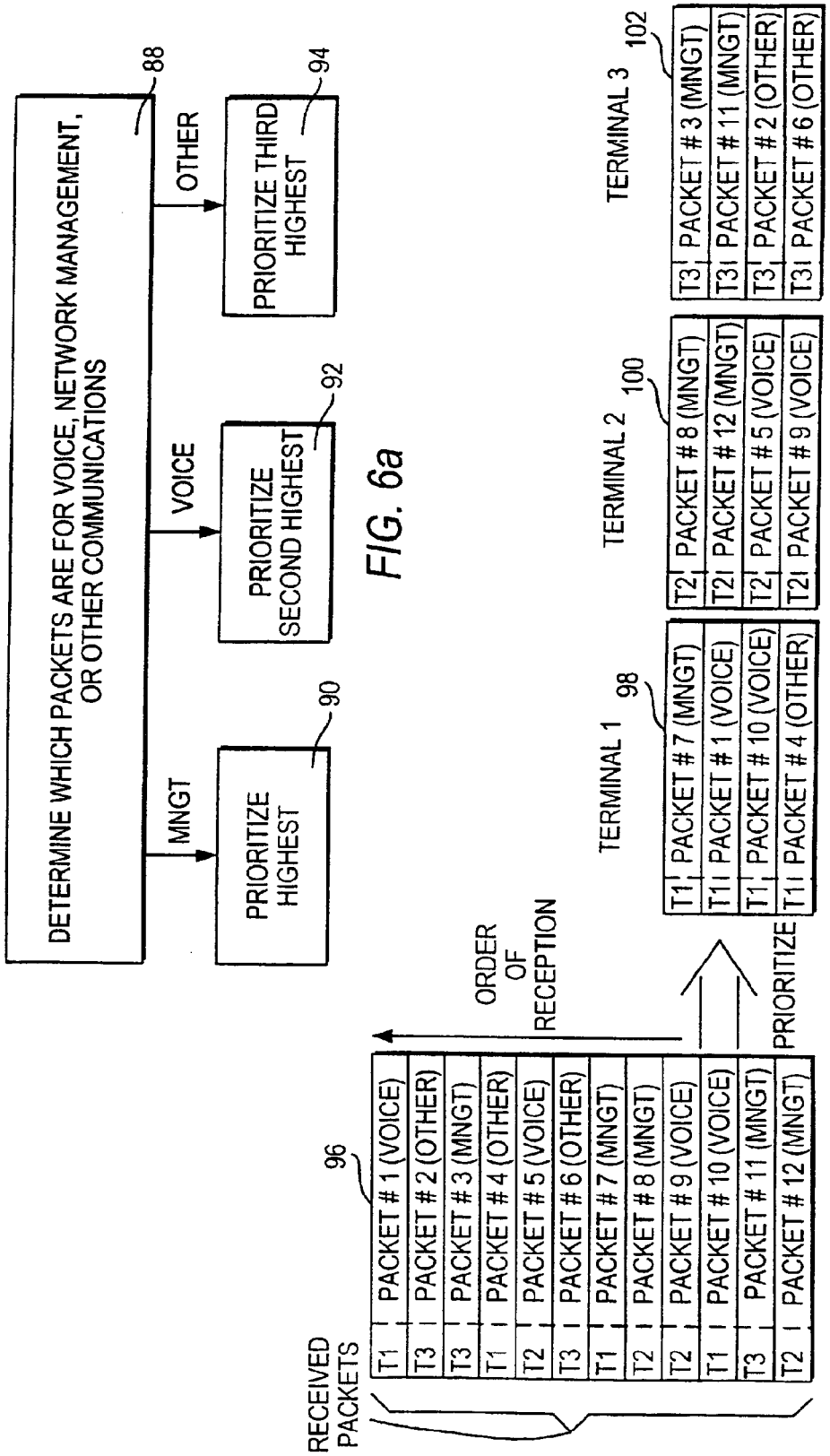
FIG. 6a is a flow chart of illustrative steps involved in managing packet traffic with multiple levels of priority in accordance with the present invention.
FIG. 6b is a diagram of illustrative queues that may be implemented based on the illustrative steps of FIG. 6a in accordance with the present invention.

In a wireless local area network, packet traffic may be managed using different levels of priority. Illustrative steps involved in prioritizing packets with different levels of priority are shown in FIG. 6a. At step 88, an access point may determine which packets are for providing voice, network management, or other communications. At step 90, packets that are for managing network operations are prioritized highest. At step 92, packets that are for voice communications are prioritized second highest. At step 94, packets that are for other communications are prioritized third highest.

Illustrative queues 96, 98, 100 and 102 of FIG. 6b may be provided based on the illustrative steps of FIG. 6a. Queue 96 may include received packets that include voice, management and other communications packets that are to be transmitted for terminals T1, T2 and T3. Queues 98, 100 and 102 may be implemented for terminals T1, T2 and T3, respectively. In queues 98, 100 and 102, management packets are prioritized highest (i.e., higher than voice and other communications packets), voice packets are prioritized second highest, and other communications packets are prioritized third highest. Priority between packets that are for the same type of communications may be based on time of reception. Packets may be transmitted by the access point in the order of packet priority for each remote terminal.

Some wireless LANs use the seven-layer Open System Interconnect (OSI) reference model developed by the International Standard Organization (ISO). OSI specifies a complete set of network functions, grouped into seven layers. The seven layers are the physical layer (layer 1), data link layer (layer 2), network layer (layer 3), transport layer (layer 4), session layer (layer 5), presentation layer (layer 6) and application layer (layer 7). The network functions are structured so that each OSI layer is supported by the layers below it.

The transport layer establishes and maintains communications between applications on different computers. Communications protocols such as Transmission Control Protocol (TCP) and User Datagram Protocol (UDP) operate at the transport layer. TCP provides full-duplex connection-oriented services (i.e., maintains a virtual communications connection between end users) while UDP provides connection-less-oriented services (i.e., provides communications between end users without maintaining an open connection). The communications protocol that is typically used for voice communications in the network layer is UDP.

Figure 7A:
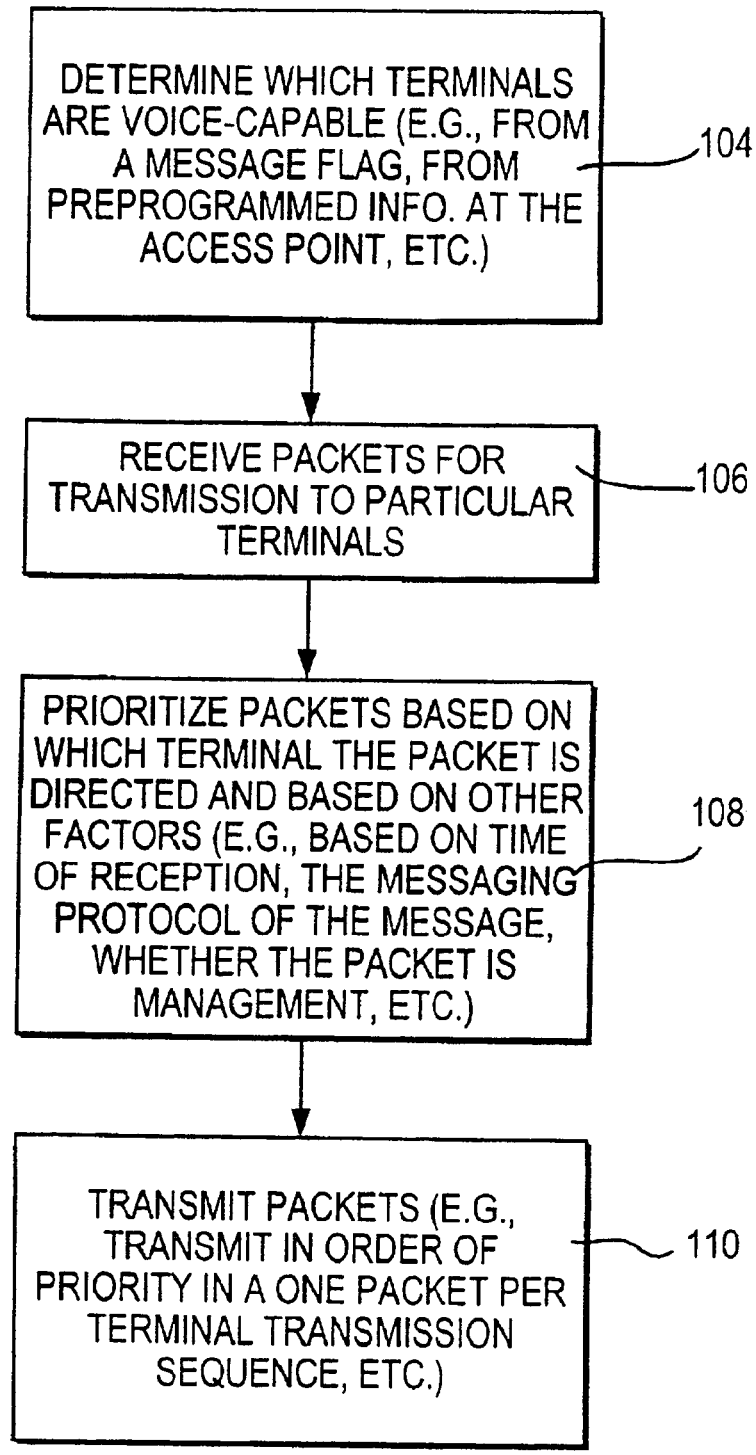
FIG. 7a is a flow chart of illustrative steps that are involved in managing packet traffic based on which terminals are voice capable in accordance with the present invention.

Illustrative steps involved in transmitting packets for use in a wireless local area network (e.g., wireless local area network 20 of FIG. 1) that is configured to implement the OSI transport layer are shown in FIG. 7*a*. At step 104, an access point may determine which terminals are voice capable. The access point may determine which terminals are voice capable based on a message flag in a packet, on pre-assigned addresses for voice-capable terminals, etc. At step 106, the access point may receive packets for transmission to the terminals. Step 106 may be performed before, after, or during step 104.

At 108, the access point may prioritize packets. Prioritization may be based on a plurality of factors. Prioritization may be based on to which terminal a packet is directed, based on the communications protocol of the packet, based on whether the packet is for network management, and further based on time of reception. At step 110, packets may be transmitted. Packets may be transmitted based on how the packets were prioritized and based on fairness (e.g., maintains fairness by maintaining an equal distribution of packets among the remote terminals).

Figure 7B:
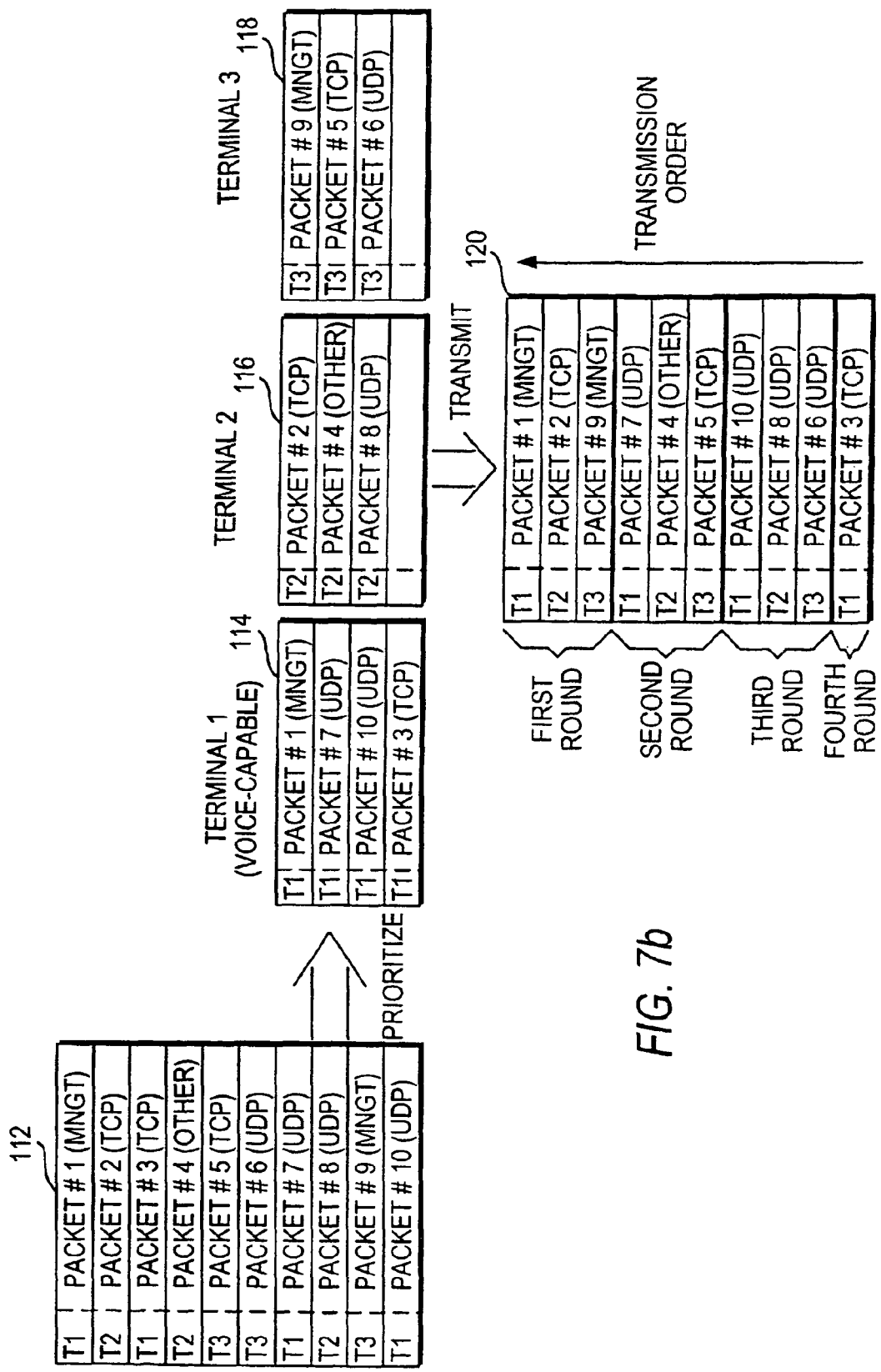
FIG. 7b is a diagram of illustrative queues that may be implemented based on the illustrative steps of FIG. 7a in accordance with the present invention.

Illustrative queues 112, 114, 116, 118 and 120 of FIG. 7*b* may be implemented based on the illustrative steps of FIG. 7*a*. Queue 112 may be a queue of received packets that are positioned in the queue 112 in the order in which they were received by an access point. Terminals T1, T2 and T3 may have already been associated with the access point when the packets were received by the access point. Queues 114, 116 and 118 may be implemented for terminals T1, T2 and T3, respectively, when the received packets are prioritized. The access point may have determined that terminal T1 is a voice-capable terminal before the packets in queue 112 were received.

Packets that are to be transmitted to manage the wireless network may have been prioritized highest. Queue 112 includes two management packets, packet no. 1 which is directed to terminal T1 (e.g., addressed to terminal T1) and packet no. 9 which is directed to terminal T3. Queue 114 for terminal T1 is implemented to have packet no. 1 have the highest priority in queue 114 and queue 118 for terminal T3 is implemented to have packet no. 9 have the highest priority in queue 118.

Packets that are to be transmitted to provide voice communications may have been prioritized second highest. The communications protocols of the OSI transport layer handle packets without determining whether the packets are for voice communications. Some networks that are implemented using the OSI transport layer use UDP for providing voice communications. An access point may determine which packets are for voice based on the communications protocol of the packets (e.g., UDP) and based on whether the packet is directed to a voice-capable terminal. Communications protocols operating in the transport layer (i.e., TCP and UDP) use Internet Protocol (IP) services in the network layer to deliver messages between source (e.g., an external network) and destination (e.g., wireless LAN 20 of FIG. 1) systems. IP packets include a protocol field that indicates that the enclosed packets are for which protocol in the Transport Layer (e.g., UDP, TCP, etc.).

Packets may be received by an access point from a half-duplex communications medium (e.g., a radio frequency channel) that is shared between the access point and remote terminals on which remote terminals communicate with the access point and received from another communications medium on which a wireline network communicates with the access point. Packets may have been transmitted to the access point using Internet Protocol (e.g., using IP packet formats) for Network Layer communications and using UDP, TCP, etc. (e.g., using UDP packet formats) for Transport Layer communications. Accordingly, packets that are received by the access point from the remote terminals may already be in conformance with the communications requirements for IP and UDP, TCP, etc. When necessary, the access point may configure packets to conform to the 802.11 standard (e.g., when two remote terminals in the wireless LAN are communicating).

The access point may read the protocol field of received IP packets to determine the Transport Layer communications protocol of received packet. Packets which are to be handled using UDP and which are directed to a voice-capable terminal may be determined by the access point to contain voice communications. The access point may have determined earlier which terminals are voice-capable through an earlier exchange with the terminals. The earlier exchange may occur when a remote terminal initially seeks to establish communications with (e.g., be associated with) an access point. If desired, the access point may have been programmed with information related to the capabilities of each terminal.

With reference again to FIG. 7*b*, queue 114 for voice-capable terminal T1 includes packet no. 7 (UDP) and packet no. 10 (UDP) which are both prioritized higher than packet no. 3 that was received before them. In queues 116 and 118, UDP packets are not prioritized higher than TCP packets since the access point has not determined that T2 and T3 are voice-capable. In queues 116 and 118, management packets (if any) are prioritized highest with all other packets being prioritized second highest.

Queue 120 includes the packets in the order in which they are to be transmitted (i.e., the transmission sequence). Packets may be transmitted in one-packet-per-terminal rounds with the highest priority packet for each terminal being transmitted in each round. Such transmission techniques allow for the quick delivery of voice communications without substantially increasing the complexity, cost, structure, or design of network equipment.

Queues 114, 116 and 118 may have been configured to be of equal size. Queues of equal size may prevent the situation in which a large number of packets for one terminal occupies most of the storage space of the access point. Such a situation may block new packets that are received by the access point to be stored due to insufficient storage space. The size of such equal sized queues may be determined based on system limitations. For illustrative purposes, queues 114, 116 and 118 are each shown to be capable of storing only four packets.

Figures 8A, 8B:
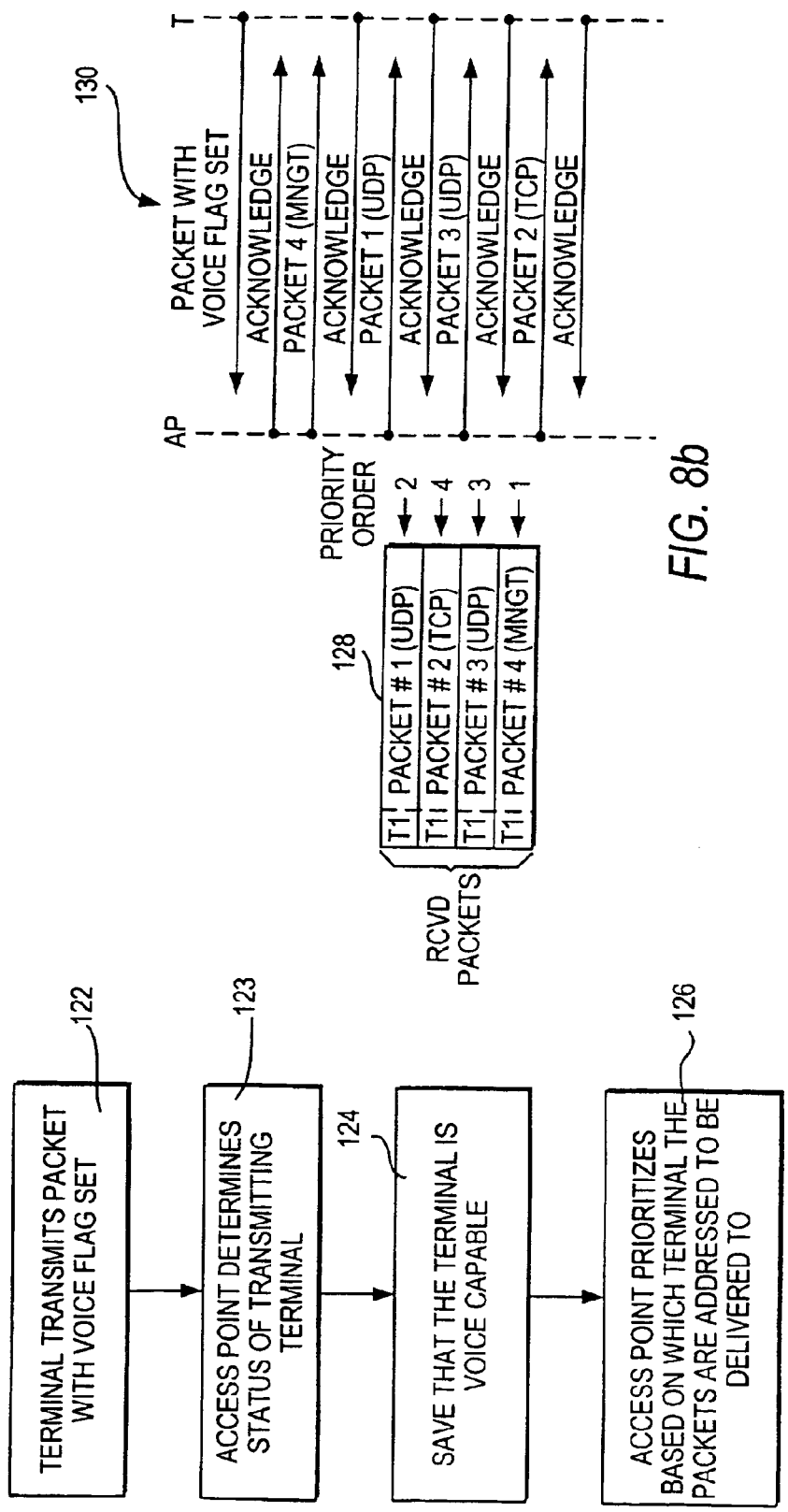
FIG. 8a is a flow chart of illustrative steps involved in managing traffic based on determining which terminals are voice capable in accordance with the present invention.
FIG. 8b is a diagram of illustrative queues that may be implemented based on the illustrative steps of FIG. 8a in accordance with the present invention.

Illustrative steps involved in prioritizing packets based on a terminal having a voice-capable status are shown in FIG. 8*a*. At step 122, a terminal may transmit a packet that includes a voice flag to an access point. The voice flag may be set to indicate that the terminal is voice-capable. At step 123, the access point may determine the status of the terminal by receiving the packet and reading the voice flag of the packet. At step 124, the access point may store information indicating the voice-capable status of the terminal. At step 126, the access point may prioritize packets based on the terminal having a voice-capable status.

Queue 128 and packet flow chart 130 of FIG. 8*b* may be implemented based on the illustrative steps of FIG. 8*a*. Chart 130 indicates that terminal T transmitted to an access point a packet having a voice flag that was set to indicate the voice-capable status of terminal T. The terminal may have transmitted the packet in an initial communications exchange between the terminal and access point. Terminal T may be a terminal that is one of a plurality of terminals that are associated with the access point.

The packets in queue 128 may have been received after the initial exchange between the access point and terminal T. The packets in queue 128 were prioritized based on the voice-capable status of terminal T (e.g., UDP packets are prioritized higher than TCP packets). Within the access point, an application may assign a priority to each packet in queue 128. The packets are then transmitted based on the assigned priorities and an acknowledgment packet is transmitted by terminal T and for each packet that is properly received by terminal T. Received packets in queue 128 are prioritized and transmitted in the following sequence: packet no. 4 (MNGT), packet no. 1 (UDP), packet no. 3 (UDP), and packet no. 2 (TCP).

Figure 9B:
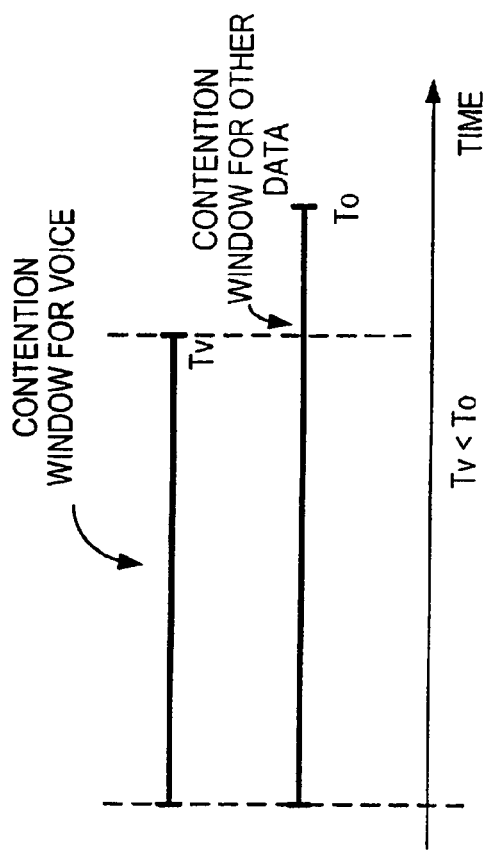
FIG. 9b is a diagram of illustrative durations for contention windows in accordance with the present invention.
Figure 9A:
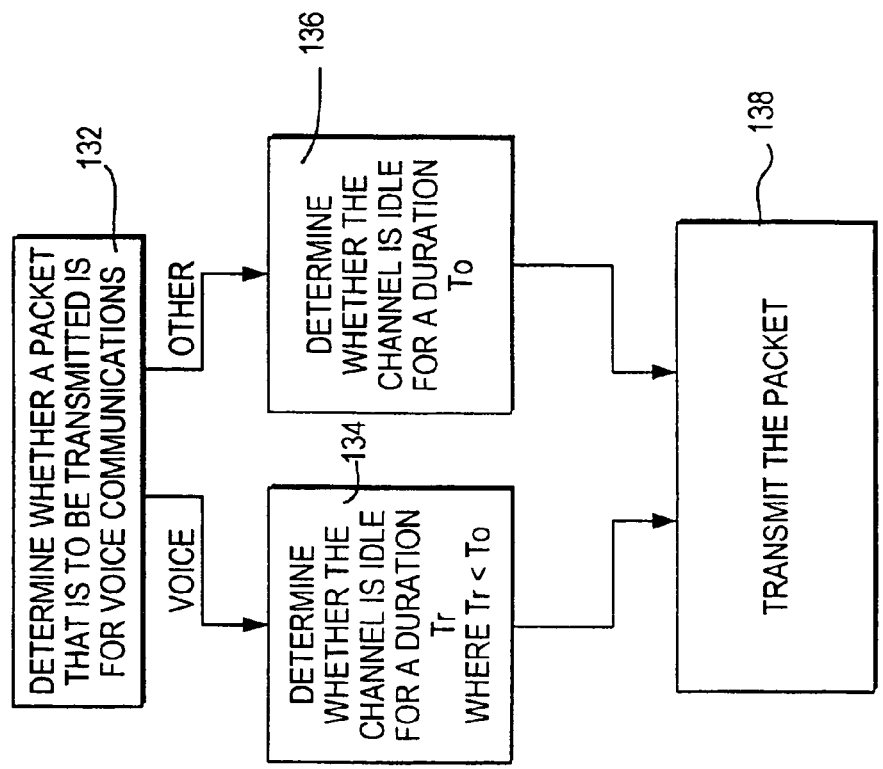
FIG. 9a is a flow chart of illustrative steps involved in using variable contention windows in accordance with the present invention.

In wireless LANs that use carrier-sense multiple access with collision avoidance (CSMA/CA) greater access to the communications bandwidth may be provided for transmitting voice communications than for transmitting other communications. Illustrative steps involved in transmitting voice packets in a CSMA/CA system are shown in FIG. 9*a*. At step 132, a transmitter (such as an access point or a terminal) may determine whether a packet that is to be transmitted is for providing voice communications. At step 136, the transmitter may determine whether the carrier channel is idle for a pre-determined duration $T_o$ (i.e., the carrier channel is available). The determination may be made using carrier sensing equipment that is implemented in the transmitter. At step 134, the transmitter may determine whether the carrier channel is idle for a duration $T_r$ that is less than duration $T_o$ (e.g., what is the duration that is actually used) when the transmitter determines that the packet that is to be transmitted is for voice communications. At step 138, the transmitter may transmit the packet when the transmitter determines that the carrier channel has been idle for an appropriate duration of time (i.e., $T_o$ or $T_r$). A contention window may specify the duration which a transmitter is to sense for a carrier channel frequency to determine whether the channel is idle (e.g., available for carrying transmissions). FIG. 9*b* shows a graph that illustrates different contention windows for voice and other data. As illustrated, a contention window for voice ($T_v$) is less than a contention window for other data ($T_0$) (i.e., $T_v < T_0$)

Figure 10A:
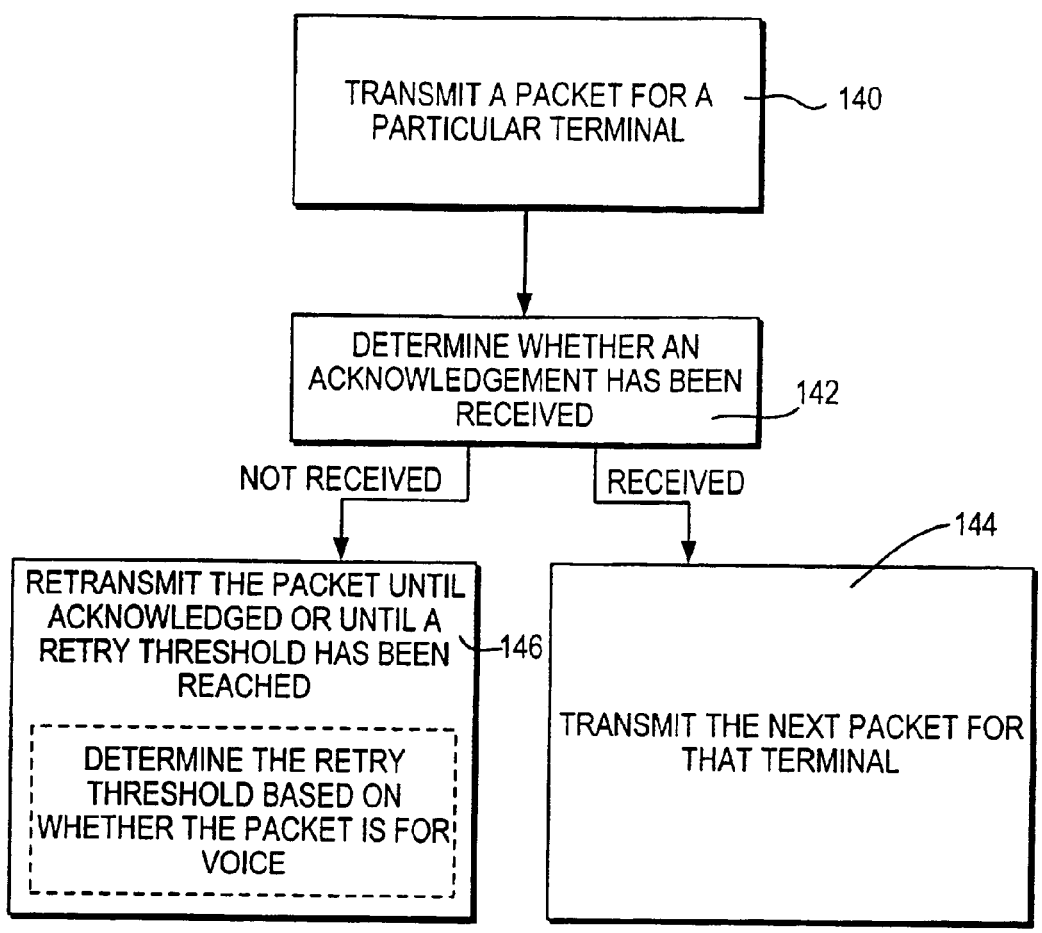
FIG. 10a is a flow chart of illustrative steps involved in transmitting packets in accordance with the present invention.

Transmitted packets may be acknowledged by each recipient by the recipient transmitting an acknowledgment packet in response to the intended recipient receiving the transmitting packet. The transmitter may then discard the transmitted packet that has been acknowledged and/or commence transmitting packets which have not yet been transmitted. Packets that have not yet been acknowledged may be retransmitted (e.g., the packets remain in queue for transmission). Illustrative steps involved in retransmitting packets for use in a wireless LAN (e.g., wireless LAN 20 of FIG. 1) are shown in FIG. 10*a*. At step 140, a packet that is directed to a particular terminal may be transmitted. At step 142, the transmitter may determine whether an acknowledge packet has been received. At step 144, the transmitter may transmit the next packet (e.g., the next highest priority packet) for that terminal after an acknowledgment has been received for the transmitted packet. At step 146, when an acknowledgment has not been received for the transmitted packet, the transmitter may continue to retransmit the packet until the packet is acknowledged or until the number of times the packet is transmitted reaches a retry threshold. Step 146 may include the step of determining the retry threshold based on whether the packet is for voice communications. The retry threshold for voice packets may be preset to be lower than the retry threshold for other packets.

Figure 10B:
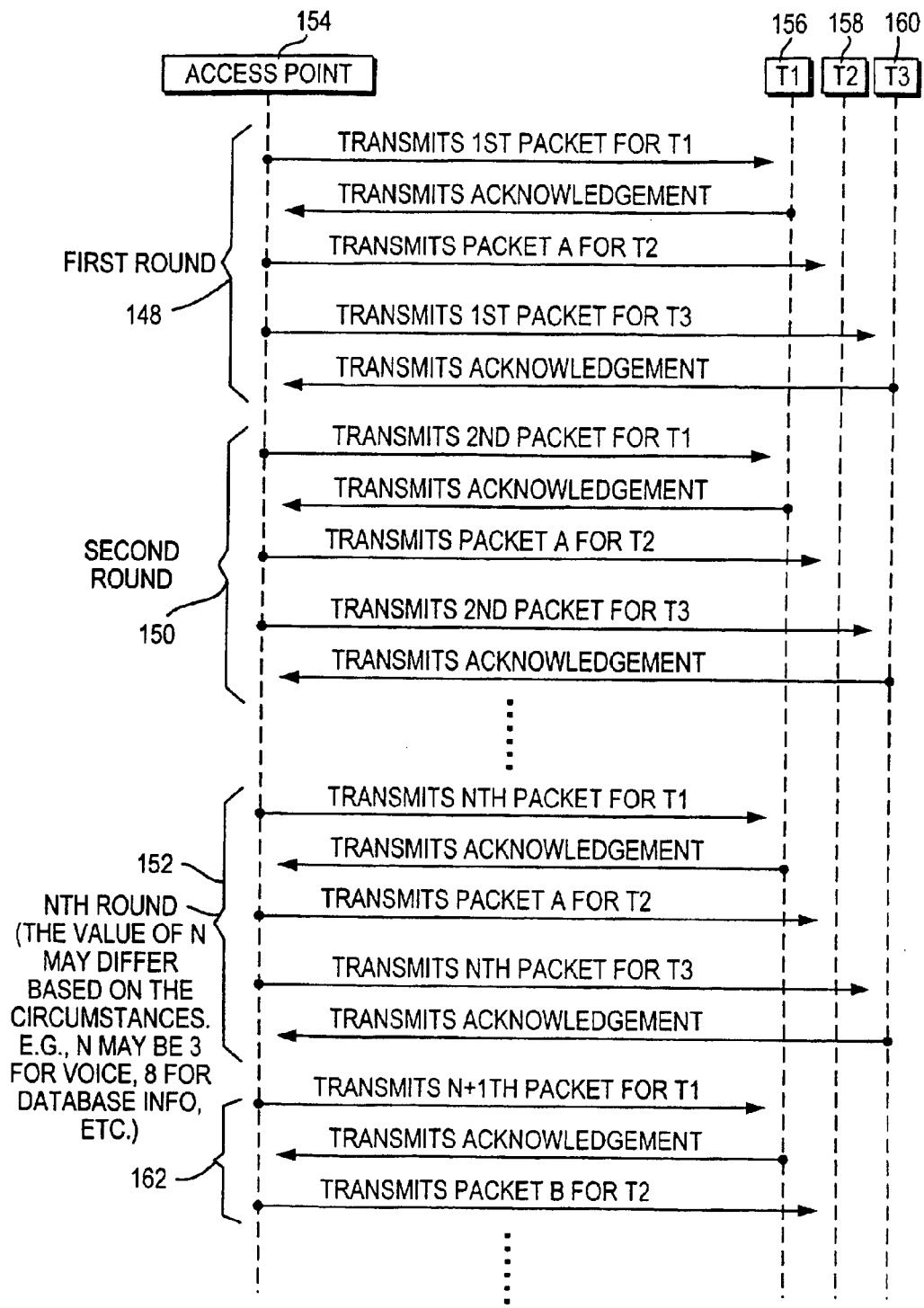
FIG. 10b is a flow chart of illustrative packet-based communications that are based on the illustrative steps of FIG. 10a in accordance with the present invention.

Illustrative packet transmission rounds 148, 150, 152 and 162 of FIG. 10*b* may be implemented based on the illustrative steps of FIG. 10*a*. In round 148 (the first round), packet A is transmitted by access point 154 to terminal T2 and an acknowledgment is not transmitted in reply by terminal T2. In round 150 (the second round), packet A is retransmitted and an acknowledgment is again not received from terminal T2. Packet A continues to be transmitted in the subsequent rounds for a total of n rounds where in each round an acknowledgment for packet A is not received. The value of n may be a retry threshold and the valve may be different for voice and data packets. After the nth round 152, retransmissions of packet A may be discontinued and a different packet (e.g., the next highest priority packet for terminal T2) may be transmitted in the subsequent round, round 162.

Figure 11A:
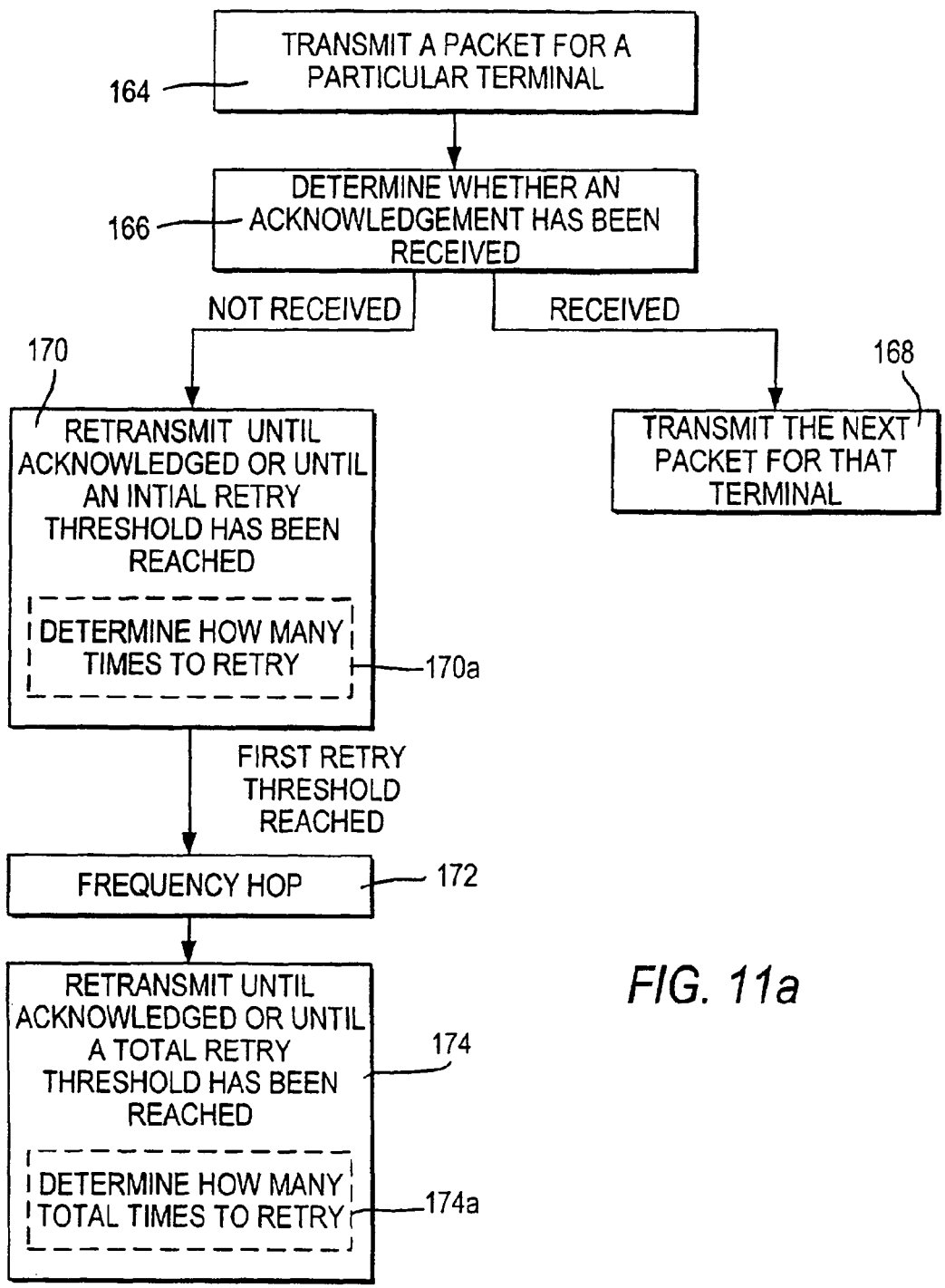
FIG. 11a is a flow chart of illustrative steps involved in packet-based communications using frequency hopping in accordance with the present invention.

Illustrative steps for retransmitting unacknowledged packets for use in a wireless LAN (e.g., wireless LAN 20 of FIG. 1) that is configured to use frequency hopping spread spectrum modulation are shown in FIG. 11*a*. At step 164, a transmitter may transmit a packet for a particular terminal. At step 166, the transmitter may determine whether an acknowledgment has been received in reply to the transmitted packet. At step 168, the transmitter may transmit the next packet for that terminal when the transmitter has determined that an acknowledgment for the transmitted packet has been received. At step 170, when it is determined that an acknowledgment has not been received, the packet is retransmitted until it is acknowledged or until an initial retry threshold has been reached (e.g., the packet has been transmitted k times). If desired, step 170 may include determining how many times to retry transmission (step 170*a*) (e.g., based on whether the packet is for voice communications). When the initial retry threshold is reached, further retry transmissions are halted until after a frequency hop in modulation (step 172). At 174, the packet may be further retransmitted until it is acknowledged or until a total retry threshold has been reached. If desired, step 174 may include a step 174*a* for determining how many total times to retry the transmission of the packet (e.g., based on whether the packet is for voice communications).

Figure 11B:
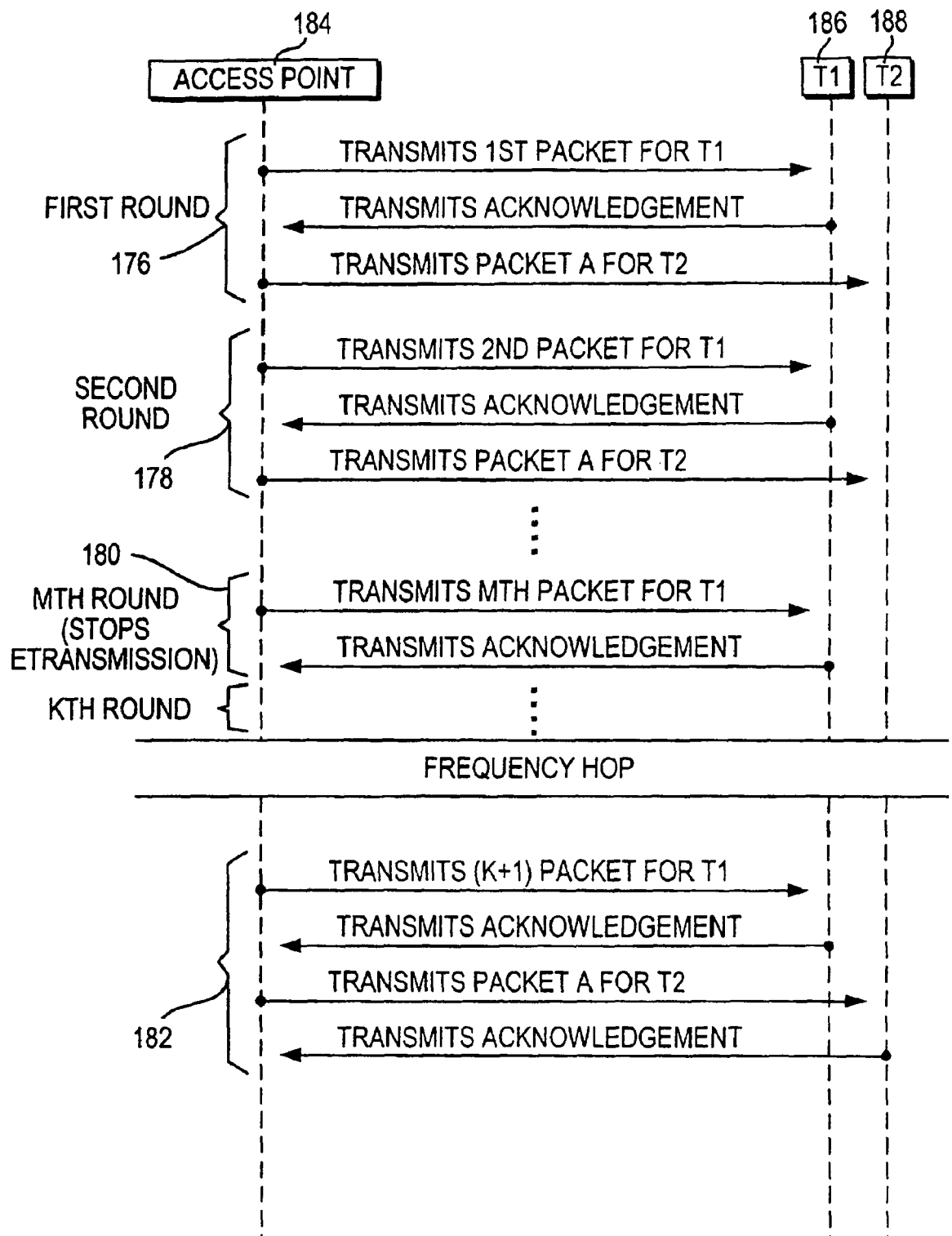
FIG. 11b is a flow chart of illustrative packet-based communications that are based on the illustrative steps of FIG. 11a in accordance with the present invention.

Illustrative transmission rounds 176, 178, 180 and 182 of FIG. 11*b* may be implemented based on the illustrative steps of FIG. 11*a*. In round 176, access point 184 may transmit packet A to terminal T2. In round 178, access point 184 may again transmit packet A to terminal T2 when an acknowledgment packet was not received for packet A in the previous round. In the following rounds, access point 184 continues to retransmit packet A while a responsive acknowledgment has not been received and until packet A has been transmitted a particular number of times k. When packet A has been transmitted k times, any further retransmissions are halted until a hop in the frequency that is being used for spread spectrum communications. In round 182 after a frequency hop, access point 184 resumes transmitting packets to terminal T2.

Figure 12A:
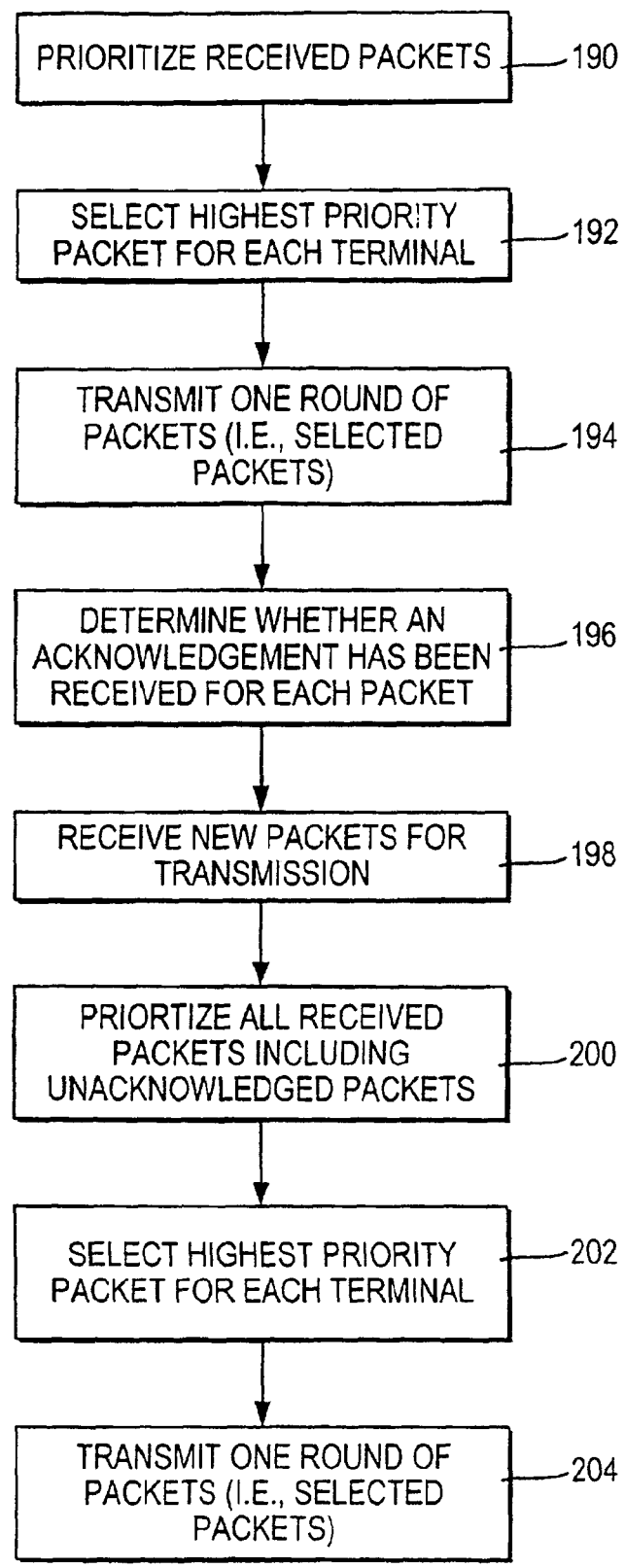
FIG. 12a is a flow chart of illustrative steps involved in incrementally transmitting packets in accordance with the present invention.

Retransmission of an unacknowledged packet may be preempted by the reception of a packet that has a higher priority than the unacknowledged packet. Illustrative steps involved in transmitting a highest priority packet for each terminal in a wireless local area network (e.g., wireless LAN of FIG. 1) are shown in FIG. 12a. At step 190, received packets may be prioritized. At step 192, the highest priority packet for each terminal may be selected. At step 194, one round of packets (e.g., the selected packets) are transmitted. At step 196, the transmitter determines whether an acknowledgment has been received for each transmitted packet. At step 198, new packets are received for transmission. At step 200, the packets that are to be transmitted (i.e., the received packets and the unacknowledged packets) are prioritized. At step 202, the highest priority packet for each terminal is selected. At step 204, another round of packets is transmitted.

Figure 12B:
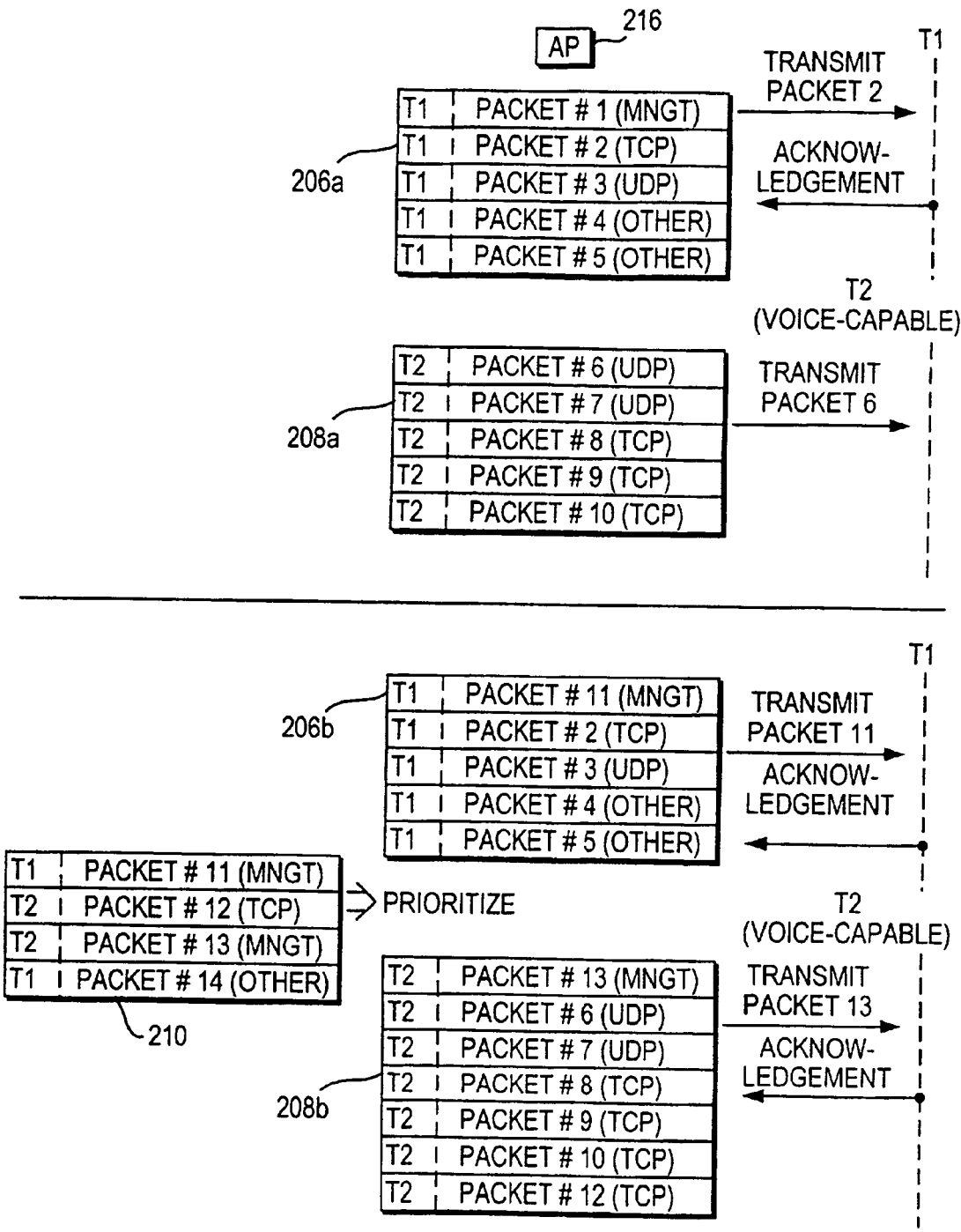
FIG. 12b is a diagram of illustrative queues that may be implemented based on the illustrative steps of FIG. 12a in accordance with the present invention.

Illustrative queues 206a, 206b, 208a, 208b, and 210 of FIG. 12b may be implemented based on the illustrative steps of FIG. 12a. Queue 206a and 208a may be queues that include prioritized packets that access point 216 is to transmit to terminals T1 and T2, respectively. In a first round, when a half-duplex communications channel (e.g., a predetermined frequency band on which multiple devices communicate using CSMA and spread spectrum modulation) is determined to be idle, the access point may transmit packets nos. 1 and 6 which are the highest priority packets for T1 and T2, respectively. In the first round, packet no. 6 (UDP) that is transmitted to a voice-capable terminal T2 is unacknowledged by terminal T2. For the next round, packet no. 6 is reinserted into queue 208a for terminal T2. Additional packets 210 may be received by the access point 216 for transmission to terminals T1 and T2 before the next round of packets are to be transmitted. Queues 206b and 208b may be implemented when the additional packets are prioritized. Queues 206b and 208b include prioritized packets that are to be transmitted to terminals T1 and T2, respectively. In the previous round, packet no. 6 for terminal T2 was unacknowledged and reinserted into queue 208a. New management packet 13 for terminal T2 has been received after the first round and has been prioritized to have a higher priority than packet no. 6. When access point 216 transmits the highest priority packet for terminal T2, packet no. 13 is transmitted over unacknowledged packet no. 6. Thus, retransmission of packet no. 6 is preempted by transmission of higher priority packet no. 13. Retransmission may commence in a future round when packet no. 6 is the highest priority packet that is pending to be transmitted for terminal T2.

Thus it is seen that a wireless LAN system and methods are provided that effectively carry mixed traffic communications. Greater priority is given to the transmission of packets for voice communications than for data communications while preventing transmission of data communications from being substantially blocked. Moreover, the system and methods, while meeting the complex demands of a mixed communications traffic environment, may still be implemented without substantial increases in structure, complexity, cost, processing delay, etc. over known wireless LAN systems and methods.

The foregoing is merely illustrative of the principles of this invention and various modifications can be made by those skilled in the art without departing from the scope and spirit of the invention.

What is claimed is:

1. A method, comprising:
   selecting a first packet of a plurality of packets, the selection being based on a destination address priority and a packet priority;
   transmitting the first packet;
   determining that an acknowledgement packet was not received in response to transmitting the first packet; and
   retransmitting the first selected packet, wherein the determining and retransmitting steps are repeated a predetermined first number of times dependant on the packet priority;
   wherein when the predetermined first number of times is reached, further retry transmissions are halted until after a frequency hop in modulation, after which the unacknowledged packet is further retransmitted until a predetermined second number of times.

2. The method of claim 1, wherein the predetermined first number of times is lower for high priority packets and higher for low priority packets.

3. A method, comprising:
   selecting one of a plurality of transmission queues, each queue including at least one packet, the selection being based on a destination address priority and a packet priority, wherein each of the transmission queues corresponds to a destination address of the at least one packet in the queue;
   transmitting the at least one packet from the selected transmission queue, wherein the at least one packet of the selected transmission queue is a plurality of packets, each packet having a priority level, and the transmitted packet being the packet having a highest priority level, wherein a management packet is prioritized highest, a voice packet is prioritized second highest, and other communications packets are prioritized third highest;
   determining that an acknowledgement packet was not received in response to transmitting the at least one packet; and
   retransmitting the at least one packet, wherein the determining and retransmitting steps are repeated a predetermined first number of times dependant on the packet priority;
   wherein when the predetermined first number of times is reached, further retry transmissions are halted until after a frequency hop in modulation, after which the unacknowledged packet is further retransmitted until a predetermined second number of times.

4. The method of claim 3, wherein the predetermined first number of times is lower for high priority packets and higher for low priority packets.

5. The method of claim 3, wherein the at least one packet includes more than one packet for transmission.

6. An access point, comprising:
   a memory;
   a processor defining a plurality of transmission queues in the memory, each transmission queue including at least one packet, the each transmission queue corresponding to a remote terminal, the processor selecting one of the transmission queues, the selection being based on a destination address priority and a packet priority; and
   a transmitter transmitting the at least one packet from the selected transmission queue to the remote terminal corresponding to the selected transmission queue, wherein the at least one packet of the selected transmission queue is a plurality of packets, each packet having a priority level, and the transmitted packet being the packet having a highest priority level, wherein a management packet is prioritized highest, a voice packet is prioritized second highest, and other communications packets are prioritized third highest;
   wherein the processor determining that an acknowledgement packet was not received in response to transmitting the at least one packet, and the transmitter retransmitting the at least one packet, wherein the determining and retransmitting steps are repeated a predetermined first number of times dependant on the packet priority;
   wherein when the predetermined first number of times is reached, further retry transmissions are halted until after a frequency hop in modulation, after which the unacknowledged packet is further retransmitted until a predetermined second number of times.

7. The access point of claim 6, wherein the predetermined first number of times is lower for high priority packets and higher for low priority packets.

8. The access point of claim 6, wherein the at least one packet for transmitting is more than one packet.

9. The access point of claim 6, wherein the memory is included in the processor.

10. A computer readable memory storing a set of instructions executable by a processor, the set of instructions being operable to:

define a plurality of transmission queues, each transmission queue corresponding to a remote terminal;

store at least one packet in each transmission queue;

select one of the transmission queues, the selection being based on a destination address priority and a packet priority;

transmit the at least one packet from the selected transmission queue to the remote terminal corresponding to the selected transmission queue, wherein the at least one packet of the selected transmission queue is a plurality of packets, the transmitted packet being the packet having a highest priority level, wherein a management packet is prioritized highest, a voice packet is prioritized second highest, and other communications packets are prioritized third highest determine that an acknowledgement packet was not received in response to transmitting the at least one packet; and retransmit the at least one selected packet a predetermined number of times dependant on the packet priority;

wherein when the predetermined first number of times is reached, further retry transmissions are halted until after a frequency hop in modulation, after which the unacknowledged packet is further retransmitted until a predetermined second number of times.

* * * * *

UNITED STATES PATENT AND TRADEMARK OFFICE
CERTIFICATE OF CORRECTION

| | |
|---|---|
| PATENT NO. | : 8,189,542 B2 |
| APPLICATION NO. | : 11/192574 |
| DATED | : May 29, 2012 |
| INVENTOR(S) | : Beach et al. |

Page 1 of 1

It is certified that error appears in the above-identified patent and that said Letters Patent is hereby corrected as shown below:

In the Drawings:

In Fig. 4a, Sheet 4 of 16, for Tag "68", in Line 1, delete "DETEMINE" and insert -- DETERMINE --, therefor.

In Fig. 11b, Sheet 14 of 16, under Tag "180", in Line 3, delete "ETRANSMISSION)" and insert -- RETRANSMISSION) --, therefor.

In Column 16, Line 7, in Claim 10, delete "highest" and insert -- highest; --, therefor.

Signed and Sealed this
Eighth Day of January, 2013

David J. Kappos
*Director of the United States Patent and Trademark Office*